US008462622B2

(12) United States Patent
Jamp et al.

(10) Patent No.: US 8,462,622 B2
(45) Date of Patent: Jun. 11, 2013

(54) DETECTION OF CO-LOCATED INTERFERENCE IN A MULTI-RADIO COEXISTENCE ENVIRONMENT

(75) Inventors: Joe I. Jamp, Los Altos, CA (US); Manev Luthra, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 12/846,427

(22) Filed: Jul. 29, 2010

(65) Prior Publication Data

US 2011/0268024 A1 Nov. 3, 2011

Related U.S. Application Data

(63) Continuation-in-part of application No. 12/633,150, filed on Dec. 8, 2009.

(51) Int. Cl.
*H04L 1/00* (2006.01)
*H04W 4/00* (2009.01)

(52) U.S. Cl.
USPC .......................................... 370/229; 370/328

(58) Field of Classification Search
None
See application file for complete search history.

(56) References Cited

U.S. PATENT DOCUMENTS

| 7,046,649 | B2 | 5/2006 | Awater et al. |
| 7,151,764 | B1 | 12/2006 | Heinonen et al. |
| 7,460,543 | B2 | 12/2008 | Malik et al. |
| 7,568,034 | B1 | 7/2009 | Dulitz et al. |
| 7,814,224 | B2 | 10/2010 | Maruyama et al. |
| 2002/0136233 | A1 | 9/2002 | Chen et al. |
| 2004/0156367 | A1 | 8/2004 | Albuquerque et al. |
| 2004/0242258 | A1 | 12/2004 | Kim |
| 2005/0185651 | A1 | 8/2005 | Rinne |
| 2006/0030266 | A1 | 2/2006 | Desai et al. |
| 2006/0221825 | A1* | 10/2006 | Okano .......................... 370/229 |
| 2006/0292986 | A1 | 12/2006 | Bitran et al. |
| 2007/0021066 | A1 | 1/2007 | Dravida et al. |
| 2007/0135162 | A1* | 6/2007 | Banerjea et al. ........... 455/556.1 |
| 2007/0165754 | A1 | 7/2007 | Kiukkonen et al. |
| 2007/0183338 | A1 | 8/2007 | Singh et al. |
| 2007/0275746 | A1 | 11/2007 | Bitran |
| 2008/0095124 | A1 | 4/2008 | Ramos et al. |
| 2008/0102885 | A1 | 5/2008 | Tu et al. |
| 2008/0123682 | A1 | 5/2008 | Yackoski et al. |

(Continued)

OTHER PUBLICATIONS

International Search Report and Written Opinion—PCT/US2011/045888—ISA/EPO—Dec. 13, 7 pages.

(Continued)

*Primary Examiner* — Clemence Han
(74) *Attorney, Agent, or Firm* — DeLizio Gilliam, PLLC

(57) ABSTRACT

Unscheduled transmissions of one wireless network device while a collocated wireless network device has control of a communication medium can corrupt packets received by the collocated wireless network device. Interference between the collocated wireless network devices can lead to degradation in performance of either/both the wireless network devices. In a communication system comprising a first wireless network device collocated with a second wireless network device, the first wireless network device can be configured to transmit a coexistence message to the second wireless network device when the first wireless network device transmits a packet without control of the communication medium. On receiving the coexistence message indicating that the first wireless network device transmitted a packet without control of the communication medium, the second wireless network device can discard any packets received at the second wireless network device and can request retransmission of the discarded packets.

21 Claims, 12 Drawing Sheets

U.S. PATENT DOCUMENTS

| | | | |
|---|---|---|---|
| 2008/0130603 | A1 | 6/2008 | Wentink et al. |
| 2008/0240139 | A1 | 10/2008 | Kodialam et al. |
| 2008/0259846 | A1 | 10/2008 | Gonikberg et al. |
| 2009/0010152 | A1 | 1/2009 | Ofek et al. |
| 2009/0137206 | A1 | 5/2009 | Sherman et al. |
| 2009/0247217 | A1 | 10/2009 | Hsu et al. |
| 2009/0252095 | A1 | 10/2009 | Lu et al. |
| 2009/0258607 | A1 | 10/2009 | Beninghaus et al. |
| 2009/0298522 | A1 | 12/2009 | Chaudhri et al. |
| 2010/0284380 | A1 | 11/2010 | Banerjee et al. |
| 2011/0009060 | A1 | 1/2011 | Hsu et al. |

OTHER PUBLICATIONS

"U.S. Appl. No. 12/620,270 Office Action", Dec. 8, 2011, 8 pages.
"CSR Bluetooth and IEEE 802.11b Co-Existence Solution", *CSR BlueCore 2-External* Feb. 2003, 20 pages.
"CSR Co-Existence Scheme Definition", *BlueCore 3-External* Nov. 2003, 8 pages.
"How 802.11b/g WLAN and Bluetooth Can Play", *Philips* Sep. 2005, 5 pages.
"Three Wire Interface", *Infineon Technologies* Functional Design Document Oct. 4, 2004, 6 pages.
"Wi-Fi and Bluetooth—Interference Issues", *Hewlett Packard* Jan. 2002, 6 pages.
U.S. Appl. No. 12/236,604, filed Sep. 24, 2008, Nam, Kyungwan et al.
U.S. Appl. No. 12/620,270, filed Nov. 17, 2009, Hirsch, Olaf et al.
U.S. Appl. No. 12/633,150, filed Dec. 8, 2009, Luthra, Manev.
U.S. Appl. No. 12/639,207, filed Dec. 16, 2009, Luthra, Manev.
U.S. Appl. No. 12/651,871, filed Jan. 4, 2010, Husted, Paul J.
Bluetooth, , "Bluetooth Core Specification Version 3.0", vol. 2, part B: Core System Package [Controller volume] http://www.bluetooth.com/Bluetooth/Technology/Building/Specifications/(Obtained from the Internet Nov. 4, 2009) Apr. 21, 2009, pp. 59-206.
"U.S. Appl. No. 12/236,604 Office Action", Jun. 29, 2011, 39 pages.
Golmie, N.; Chevrollier, N.; Rebala, O.; , "Bluetooth and WLAN coexistence: challenges and solutions," Wireless Communications, IEEE, vol. 10, No. 6, pp. 22-29, Dec. 2003 doi: 10.1109/MWC.2003.1265849 URL:http://ieeexplore.ieee.org/stamp/stamp.jsp?tp=&arnumber=1265849&isnumber=28311.
"U.S. Appl. No. 12/633,150 Office Action", Jun. 19, 2012, 35 pages.
"U.S. Appl. No. 12/639,207 Office Action", Apr. 24, 2012, 31 pages.
International Preliminary Report on Patentability—PCT/US2011/045888—The International Bureau of WIPO Geneva, Switzerland, Jun. 28, 2012, 7 pages.
U.S. Appl. No. 12/639,207 Final Office Action Nov. 23, 2012, 29 pages.
U.S. Appl. No. 12/633,150 Final Office Action Jan. 17, 2013, 33 pages.

\* cited by examiner

DETECTION OF CO-LOCATED INTERFERENCE IN A MULTI-RADIO COEXISTENCE ENVIRONMENT

RELATED APPLICATION

This is a continuation-in-part application of U.S. application Ser. No. 12/633,150 filed Dec. 8, 2009.

BACKGROUND

Embodiments of the inventive subject matter generally relate to the field of wireless communication and, more particularly, to detection of co-located interference in a multi-radio coexistence environment.

When wireless devices are in close proximity to each other, communication from one wireless device may interfere with communication from the other wireless device. For example, when Bluetooth® and wireless local area network (WLAN) devices operate in close proximity to each other, the radio protocol of one device can interfere with the radio protocol of the other device. The Bluetooth device can use adaptive frequency hopping (AFH) techniques to avoid frequencies on which a WLAN transmission is detected.

SUMMARY

Various embodiments for detecting co-located interference in a multi-radio coexistence environment are disclosed. In one embodiment, it is determined, at a first wireless network device of a communication system, that the first wireless network device has control of a communication medium associated with the communication system. The communication system comprises the first wireless network device and a second wireless network device. A coexistence message is received at the first wireless network device from the second wireless network device. The coexistence message indicates that the second wireless network device transmitted a packet while the first wireless network device had control of the communication medium. It is determined that a packet, received at the first wireless network device while the first wireless network device has control of the communication medium, should be discarded based, at least in part, on receiving the coexistence message that indicates that the second wireless network device transmitted a packet while the first wireless network device has control of the communication medium. Retransmission of the packet received at the first wireless network device is requested.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
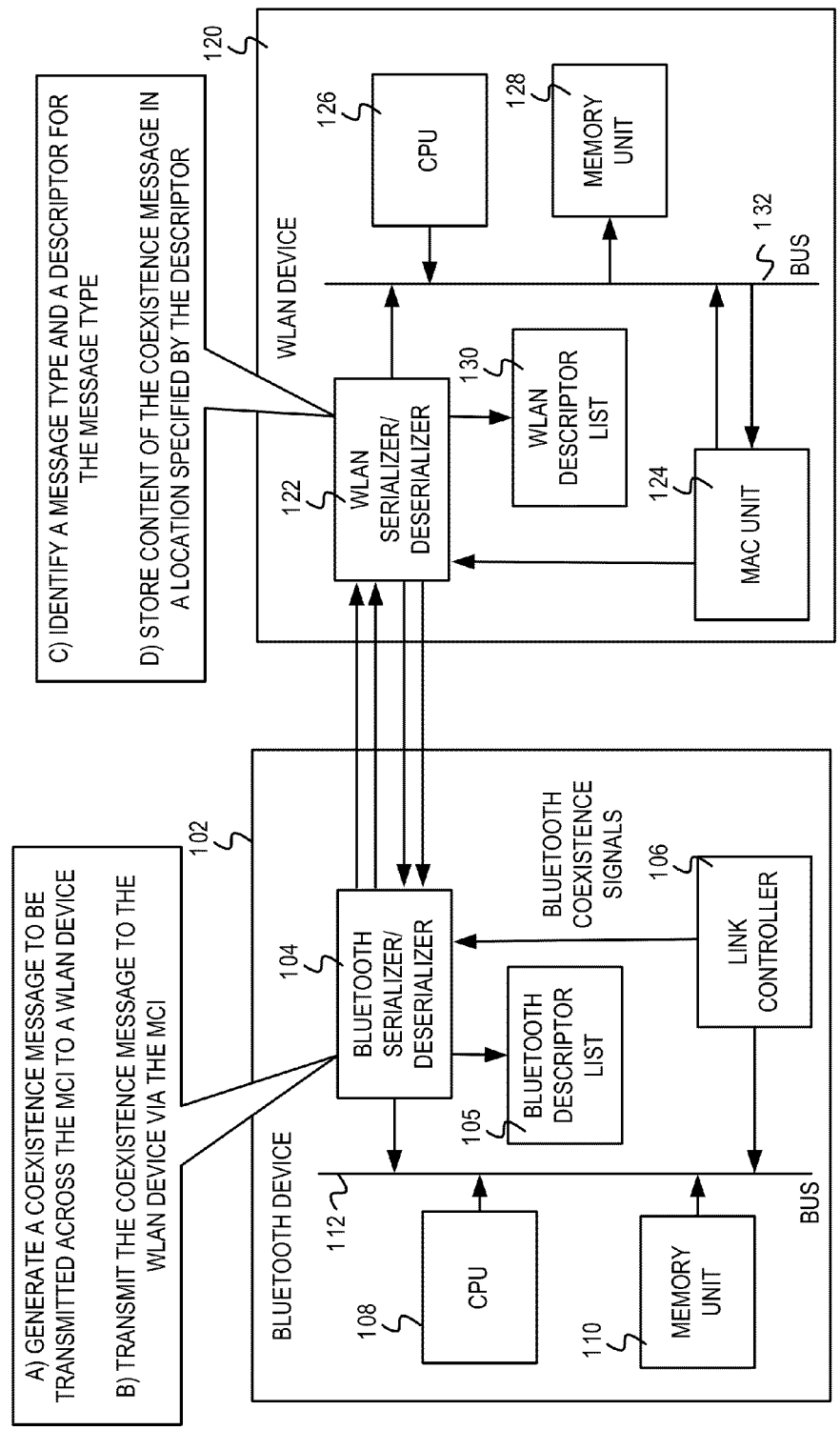
FIG. 1 is an example block diagram illustrating a coexistence mechanism based on a message based coexistence interface.

The description that follows includes exemplary systems, methods, techniques, instruction sequences, and computer program products that embody techniques of the present inventive subject matter. However, it is understood that the described embodiments may be practiced without these specific details. For instance, although examples refer to exchanging messages via a message based coexistence interface (MCI) to indicate interference between co-located WLAN and Bluetooth devices, in other embodiments other wireless standards and devices, e.g., WiMAX, ZigBee®, Wireless USB devices, etc. can exchange coexistence messages to indicate interference as described herein. In other instances, well-known instruction instances, protocols, structures, and techniques have not been shown in detail in order not to obfuscate the description.

Interference between wireless network devices (e.g., a Bluetooth device and a WLAN device) may be caused when the wireless network devices are collocated on a common system and/or are communicating (e.g., transmitting or receiving signals) in close proximity to each other. Such interference between the collocated wireless network devices can result in performance degradation. The wireless network devices typically exchange coexistence messages to determine control of a communication medium and to schedule communications of the wireless network devices so that the communication of one wireless network device does not interfere with the communication of the other wireless network device. However, the coexistence messages do not report ongoing communications or convey any information about transmissions that occur between time-slot boundaries (e.g., a guard interval between time slots allocated to the two collocated wireless devices to ensure that transmissions in one time slot do not overlap with transmissions in a successive time slot). After the communication medium is granted to one of the wireless network devices, the other collocated wireless network device can continue to listen and receive packets via the communication medium. Therefore, a wireless network device that transmits a packet when it does not have control of the communication medium can corrupt packets being received by the collocated wireless network device that has control of the communication medium. Moreover, the received packet (which is potentially corrupted) may erroneously pass through an error detection mechanism and may be provided to upper layer protocols. In some cases, it may not be possible to request retransmission of the packet after the packet is provided to the upper layer protocols. For example, when data packets are transmitted using a Bluetooth Object Exchange (OBEX) protocol, a strong wireless interference (e.g., transmission by a co-located WLAN device) can cause the data packets received by a co-located Bluetooth receiver to be corrupted, even though the data packets are protected by a 16-bit CRC. In some implementations, short duration interference (e.g., transmission of a WLAN ACK packet), if strong enough, can cause enough errors in the received data packets to create a false positive CRC match. This can result in data corruption and can also cause a communication link between the transmitting wireless network device and the receiving wireless network device to be terminated.

Functionality can be implemented on the collocated wireless network devices to indicate packet transmission that occurs without control of the communication medium, as will be further described below with reference to FIGS. 8-12. For example, a WLAN device that transmits a packet when a collocated Bluetooth device has control of the communication medium can transmit a coexistence message to the collocated Bluetooth device. The coexistence message can indicate, to the collocated Bluetooth device, that the collocated WLAN device transmitted a packet without having control of the communication medium and that any packet received by the Bluetooth device may potentially be corrupted. Accordingly, the collocated Bluetooth device can discard the received packet and can request retransmission of the discarded packet at a physical (PHY) layer before the received packet is provided to the upper layer protocols. In other words, the coexistence message can ensure that packets that may potentially be corrupted due to transmission of collocated devices that do not have access to the communication medium are detected without relying on the CRC error detection mechanism.

FIG. 1 is an example block diagram illustrating a coexistence mechanism based on a message-based coexistence interface. FIG. 1 illustrates a Bluetooth device 102 and a WLAN device 120. In some embodiments, the Bluetooth device 102 and the WLAN device 120 may be collocated on a common system (e.g., on the same circuit board, on distinct circuit boards within the same system, etc.). In other embodiments, the Bluetooth device 102 and the WLAN device 120 can be embedded on the same chip (e.g., a system on a chip (SoC), an integrated circuit, etc.) The Bluetooth device 102 comprises a Bluetooth serializer/deserializer 104, a Bluetooth descriptor list 105, a link controller 106, a central processing unit (CPU) 108, and a memory unit 110. The link controller 106 transmits Bluetooth coexistence signals to the Bluetooth serializer/deserializer 104. The Bluetooth serializer/deserializer 104 is coupled with the Bluetooth descriptor list 105. The Bluetooth serializer/deserializer 104, the link controller 106, the CPU 108, and the memory unit 110 communicate via a bus 112. The bus 112 may be an AHB/APB bus. The WLAN unit 120 comprises a WLAN serializer/deserializer 122, a WLAN descriptor list 130, a medium access control (MAC) unit 124, a CPU 126, and a memory unit 128. The WLAN serializer/deserializer 122 is coupled with the WLAN descriptor list 130. The WLAN serializer/deserializer 122, the MAC 124, the CPU 126, and the memory unit 128 communicate via a bus 132. The bus 132 may be an AHB/APB bus. Additionally, the Bluetooth serializer/deserializer 104 is connected to the WLAN serializer/deserializer 122 via four lines. Functionality of the four connection lines will further be described with reference to FIGS. 2A and 2B.

At stage A, the Bluetooth serializer/deserializer 104 generates a coexistence message to be transmitted across the MCI to the WLAN device 120. The Bluetooth serializer/deserializer 104 may generate the coexistence message in response to receiving a trigger or content of the coexistence message. The content of the coexistence message may be received from or triggered by hardware or software. In one implementation, the CPU 108 may transmit a notification to the Bluetooth serializer/deserializer 104 indicating the content of the coexistence message is stored in a specified memory location. The Bluetooth serializer/deserializer 104 may access the specified memory location, retrieve the content of the coexistence message, and generate the coexistence message. In another implementation, the link controller 106 may transmit Bluetooth coexistence signals (e.g., indicating a start and end time of a Bluetooth transmission, a type of Bluetooth packet to be transmitted, etc.). The Bluetooth serializer/deserializer 104 may generate the coexistence message based on the Bluetooth coexistence signals from the link controller 106.

Figure 2A:
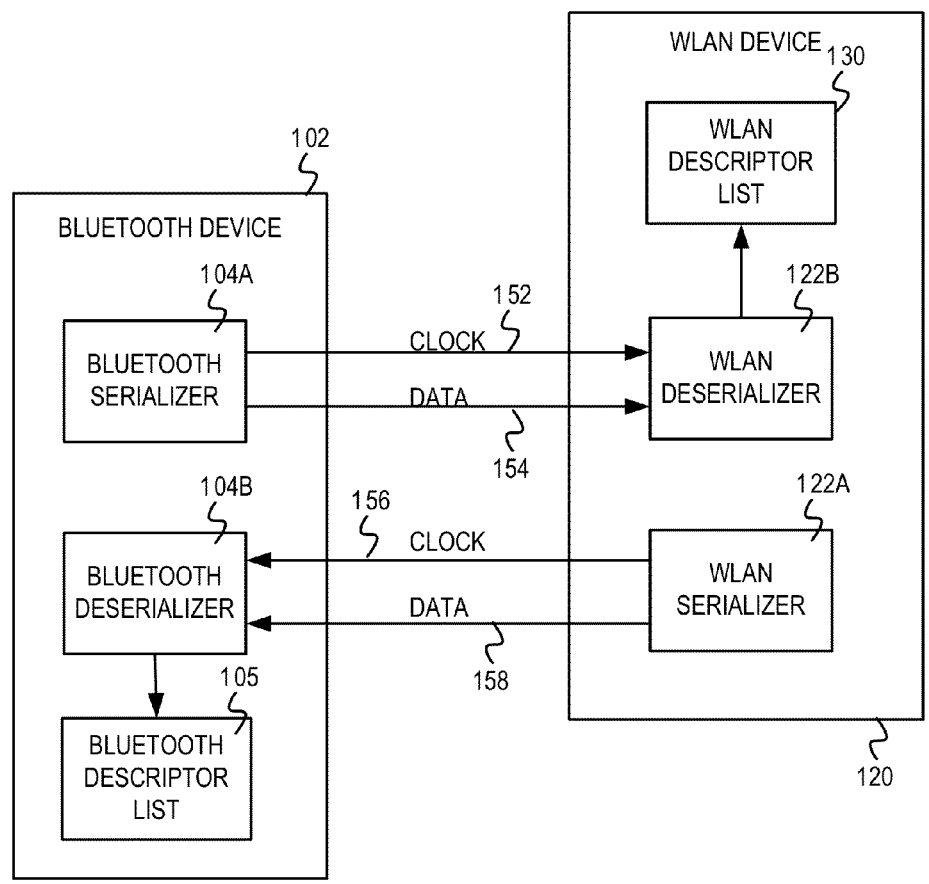
FIG. 2A is a block diagram illustrating an example structure of a Bluetooth serializer/deserializer and a WLAN serializer/deserializer.
Figure 2B:
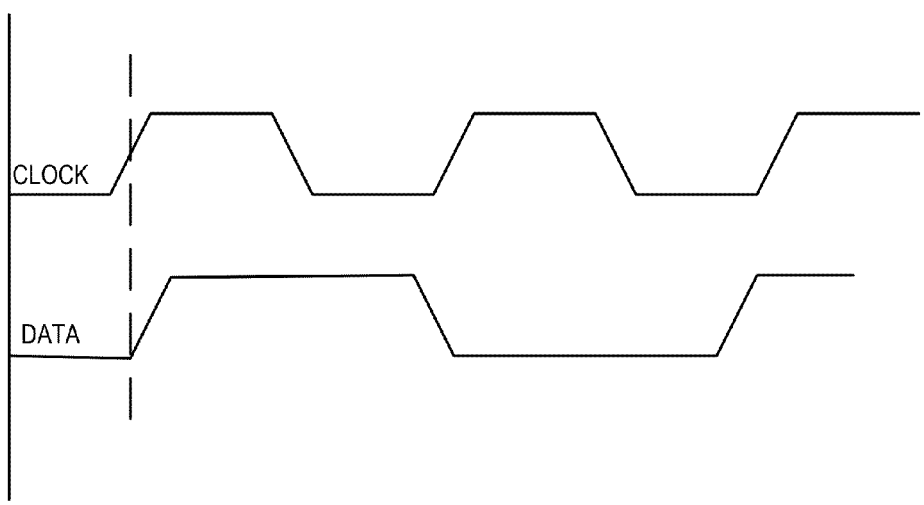
FIG. 2B is a timing diagram illustrating communication between the Bluetooth serializer/deserializer and the WLAN serializer/deserializer.

At stage B, the Bluetooth serializer/deserializer 104 transmits the coexistence message to the WLAN device 120 via the MCI. The Bluetooth serializer/deserializer 104 may transmit the coexistence message via a data line connecting the Bluetooth serializer/deserializer 104 and the WLAN serializer/deserializer 122. Referring to FIG. 2A, the Bluetooth serializer/deserializer 104 comprises a Bluetooth serializer 104A and a Bluetooth deserializer 104B. The Bluetooth deserializer 104B is coupled with the Bluetooth descriptor list 105. Likewise, the WLAN serializer/deserializer 122 comprises a WLAN serializer 122A and a WLAN deserializer 122B. The Bluetooth serializer 104A is connected to the WLAN deserializer 122B by a clock line 152 and a data line 154. Likewise, the WLAN serializer 122A is connected to the Bluetooth deserializer 104B by a clock line 156 and a data line 158. Also, the WLAN deserializer 122B is coupled with the WLAN descriptor list 130. The Bluetooth serializer 104A creates the coexistence message and converts the coexistence message into a serial format so the coexistence message can be transmitted along the data line 154. On the WLAN device 120, the WLAN deserializer 122B receives the coexistence message in a serial format, converts the serial coexistence message into a parallel format, and accordingly processes the coexistence message. Likewise, the WLAN serializer 122A can create a coexistence message and convert the coexistence message into a serial format for transmission along the data line 158. The Bluetooth deserializer 104B can receive the coexistence message in a serial format, converts the serial coexistence message into a parallel format, and accordingly processes the coexistence message. Moreover, the Bluetooth deserializer 104B, in response to receiving a coexistence message from the WLAN serializer 122A, may access the Bluetooth descriptor list 105, to identify one or more descriptors associated with the message type. As indicated in FIG. 2B, data is transmitted along the data line—the data line 154 for communication from the Bluetooth device 102 to the WLAN device 120 and the data line 158 for communication from the WLAN device 120 to the Bluetooth device 102. The clock lines 152 and 156 control data transmission along the data lines 154 and 158 respectively. In some implementations, data is transmitted synchronous to the rising edge of the clock. In some implementations, the clock may be active only while data is being transmitted and may be inactive when no data is being transmitted. However, it should be noted that in some implementations, the signaling could differ. For example, data might be transmitted based on a double data rate (DDR) signaling mechanism with data changing on both the rising and the falling clock edges. In other implementations, the signaling and data transmissions could be spread across a wider bus. In one implementation, the minimum clock frequency during active mode may be 10 MHz, while in other implementations, the clock may be programmed to operate with any suitable clock frequency.

At stage C in FIG. 1, the WLAN serializer/deserializer 122 identifies a message type associated with the coexistence message and a descriptor for the message type. As described earlier, the WLAN deserializer 122B of FIG. 2 receives the coexistence message transmitted by the Bluetooth serializer 104A. The WLAN deserializer 122B can determine the message type associated with the coexistence message by identifying a message tag in a header of the coexistence message. For example, a message tag of 0101 may indicate that the coexistence message comprises scheduling information. The WLAN deserializer 122B also accesses the WLAN descriptor list 130 to identify one or more descriptors associated with the message type. A descriptor may be a software instruction that indicates how the coexistence message should be consumed. The descriptor can indicate how many words of the coexistence message should be decoded, whether the coexistence message was initiated by hardware (e.g., the link controller 106) or software (e.g., the CPU 108), etc. The descriptor may indicate that content of specified fields of the coexistence message should be retrieved. The descriptors may also indicate a location (e.g., in RAM, hardware registers, etc.) where the retrieved content should be stored. The WLAN deserializer 122B may determine a number of descriptors associated with the message type and how the coexistence message should be consumed. The interpretation of the descriptor may depend on the message tag. In other words, the descriptor format may depend on the message tag. Additionally, in some implementations, different message tags may map to the same descriptor. The format and functionality of the descriptors will further be described with reference to FIGS. 6, 7A, and 7B.

At stage D, the WLAN deserializer 122B stores the content of the coexistence message in a location specified by the descriptor. The coexistence message may be consumed either by hardware (e.g., the MAC unit 124) or by software (e.g., the CPU 126). The WLAN deserializer 122B may store content of the coexistence message in a specified location in memory, e.g., random access memory (RAM) or in a specified hardware register. In some implementations, the content of the coexistence message may be store in multiple locations. For example, a received signal strength indicator (RSSI), retrieved from the coexistence message, may be stored in the RAM as well as in a register and multiple components of the WLAN device 120 may access and process the RSSI. The destination of the coexistence message (e.g., whether the coexistence message is stored in hardware registers or in the RAM) may not be controlled by the Bluetooth device 102 but by the WLAN device 120. In some implementations, the Bluetooth device 102 may not be cognizant of how the WLAN device 120 will receive, store, or use the information in the coexistence message. The WLAN deserializer 122B may determine how the coexistence message should be processed based on the capabilities of the WLAN device 120. For example, the WLAN deserializer 122B may store the coexistence message in the MAC 124 if a scheduling table on the WLAN device 120 is implemented in hardware. As another example, the WLAN deserializer 122B may store the coexistence message in the memory unit 128 if the scheduling table on the WLAN device 120 is implemented in software.

It should be noted that although FIGS. 1-2B describe operations of the Bluetooth device 102 creating the coexistence message, transmitting the coexistence message to the WLAN device 120, and the WLAN device 120 processing the coexistence message, in other implementations, the operations might be symmetric. In other words, the WLAN device 120 can create the coexistence message, transmit the coexistence message to the Bluetooth device 102, and the Bluetooth device 102 may process the coexistence message.

Figure 3:
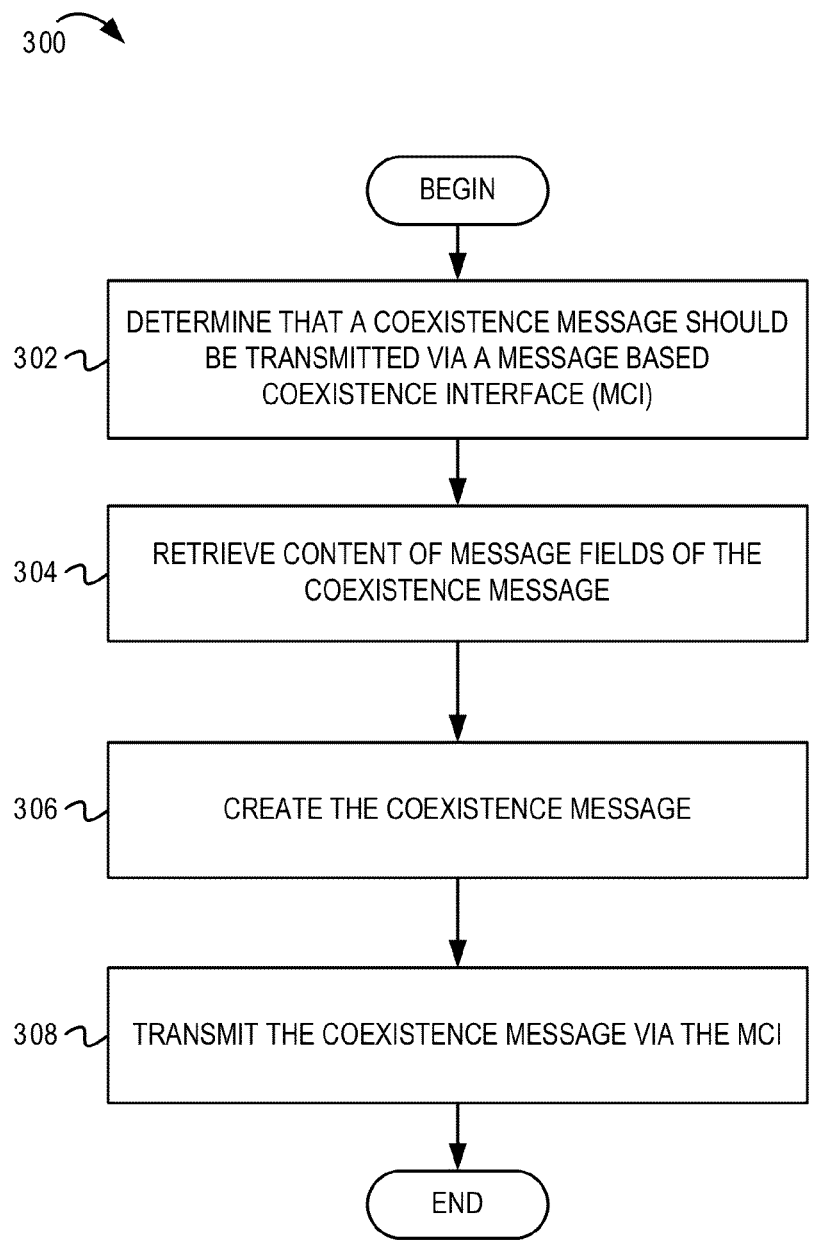
FIG. 3 is a flow diagram illustrating example operations for creating a coexistence message for transmission across a message based coexistence interface.

FIG. 3 is a flow diagram illustrating example operations for creating a coexistence message for transmission across an MCI. Flow 300 begins at block 302.

At block 302, it is determined that the coexistence message should be transmitted via the MCI. For example, the Bluetooth serializer 104A of FIG. 2A may determine that the coexistence message should be transmitted via the MCI in response to receiving a trigger from a link controller 106 or a CPU 108. For example, receiving Bluetooth coexistence information (e.g., Bluetooth link information) from the link controller 106 may serve as a trigger for the Bluetooth serializer 104A. As another example, transmission of the coexistence message may also be triggered in response to receiving a message. As another example, the Bluetooth serializer 104A of FIG. 2A may determine that the coexistence message should be transmitted in response to receiving an indication of change in sleep state from an RTC unit. As another example, the Bluetooth serializer 104A of FIG. 2A may determine that the coexistence message should be transmitted in response to receiving notifications from other processing units (e.g., baseband unit). The flow continues at block 304.

At block 304, content of message fields of the coexistence message is retrieved. In one implementation, the Bluetooth serializer 104A may receive content of the coexistence message from the link controller 106. In another implementation, the CPU 108 may specify one or more memory locations and direct the Bluetooth serializer 104A to retrieve the content of the coexistence message from the memory locations. The Bluetooth serializer 104A may retrieve the content of the coexistence message from the memory locations and create the coexistence message. For example, in accordance with directions from the CPU 108, the Bluetooth serializer 104A may retrieve priority of a Bluetooth transmission from one memory location, a start time of the Bluetooth transmission from a second memory location, and a stop time of the Bluetooth transmission from a third memory location. The Bluetooth serializer 104A may then create the coexistence message comprising the retrieved priority, start time, and stop time. The flow continues at block 306.

At block 306, the coexistence message is created. For example, the Bluetooth serializer 104A may create the coexistence message. As described earlier, the Bluetooth serializer 104A may receive content of the coexistence message from the link controller 106 or may access a memory unit 110 and retrieve the content of the coexistence message. The Bluetooth serializer 104A may create the coexistence message in any suitable format depending on the content of the coexistence message. Example formats of the coexistence message are illustrated in FIGS. 4A, 4B, and 4C.

Figure 4A:
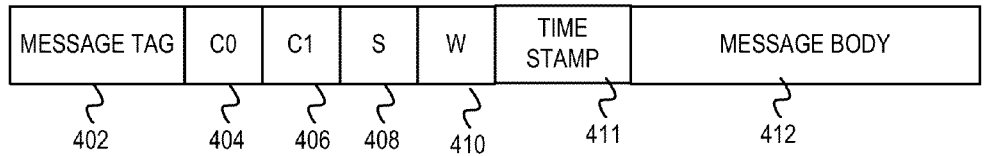
FIG. 4A illustrates an example format of a coexistence message.

FIG. 4A illustrates an example coexistence message format 400. The coexistence message format 400 may be utilized for transmitting general-purpose messages. These messages may be used by software for implementing high-level protocols between the Bluetooth device 102 and the WLAN device 120. The coexistence message 400 comprises a message tag 402, message-type fields C0 404 and C1 406, a sleep status (S) field 408, a wakeup (W) request field 410, a timestamp field 411, and a message body 412. The message tag 402 can indicate the content of the coexistence message. For example, a message tag 402 of 0101 may indicate that the coexistence message comprises scheduling information. In one example, the Bluetooth serializer 104A can set fields {C0, C1} to {0, 0} to indicate that the coexistence message is a general-purpose message. The Bluetooth serializer 104A may indicate the message format using C0 and C1 to enable a WLAN deserializer 122B to accurately process the coexistence message. The sleep status field 406 can indicate a sleep status and the wakeup request field 410 can be used to interrupt and request wakeup if the WLAN device 120 is asleep. The timestamp field 411 can indicate a time instant at which the coexistence message was created. The message body 412 comprises the content of the coexistence message determined at block 304.

Figure 4B:
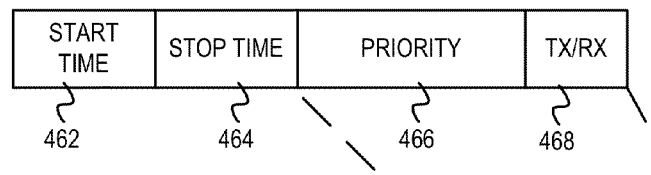
FIG. 4B illustrates a second example format of a coexistence message.
Figure 4B:
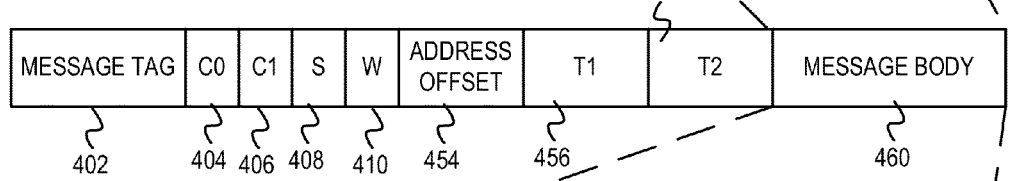
Figure 4B:
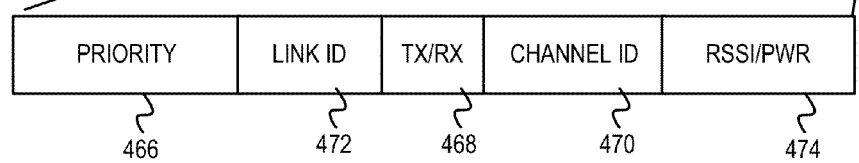

FIG. 4B illustrates another example coexistence message format 450A. The coexistence message format 450A may be utilized for generating scheduling based messages to enable coexistence between the Bluetooth device 102 and the WLAN device 120. In addition to the message tag, {C0, C1}, S, and W fields described with reference to FIG. 4A, the coexistence message 450B also comprises an address offset field 454, two timestamp fields—T1 456 and T2 458, and a message body 460. In the coexistence message 450A, in one example, the fields {C0, C1} may be set to {0, 1} to indicate that the coexistence message is a scheduling-based message. The address offset 454 may be added to a base address of a memory-mapped region specified in a descriptor to identify a location where the message body 460 should be stored. The timestamp fields 456 and 458 may be written to the memory-mapped region after a local timer is added to each of the timestamp fields 456 and 458. Coexistence messages 450B and 450C are examples illustrating use of the scheduling based message format 450A to transmit Bluetooth coexistence information from the Bluetooth device 102 to the WLAN device 120. In the coexistence message 450B, a start time of a Bluetooth communication 462 and a stop time of the Bluetooth communication 464 are transmitted in the timestamp fields 454 and 456 respectively. A priority of the Bluetooth communication 466 and a type of the Bluetooth communication 468 (e.g., whether the communication is a Bluetooth transmission or a Bluetooth reception) are transmitted as part of the message body 460. Likewise, the coexistence message 450C illustrates another embodiment for transmitting Bluetooth coexistence information in the message body 460. In coexistence message 450C, the message body 460 comprises the priority of the Bluetooth communication 466, a link identifier 472, the type of the Bluetooth communication 468, a communication channel identifier 470, and an RSSI value (or transmit power level) 474.

Figure 4C:
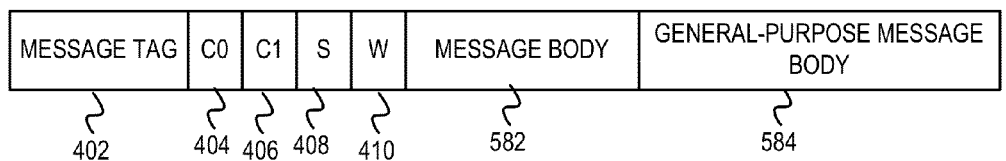
FIG. 4C illustrates a third example format of a coexistence message.

FIG. 4C illustrates another example coexistence message format 480. The coexistence message format 480 may be utilized for transmitting contention-based messages or for transmitting indication of latency sensitive events. In addition to the message tag 402, {C0, C1} 404, 406, S 408, and W 410 fields described with reference to FIG. 4A, the coexistence message format 480 also comprises a message body 582 and a general-purpose message body 584. In the coexistence message format 480, the message body 582 and the software defined general-purpose message body 584 are optional fields. In one example, the fields {C0, C1} when set to {1, 0} may indicate that the coexistence message is a contention-based message without the optional fields 582 and 584. In some implementations, either the message body 582 or the general-purpose message body 584 may be present in the coexistence message represented by message format 480. However, the fields {C0, C1} when set to {1, 1} may indicate that the contention-based message comprises the optional fields 582 and 584. In one example, the message body 582 may comprise 16 bits-8 bits of priority information, 7 bits of channel information, and 1 bit indicating whether the communication is a transmission or a reception. In one implementation, the length of the message body 582 may also be increased in multiples of 32 bits. In some implementations, the message body 582 may be followed by the optional general-purpose message body 584, which was described with reference to FIG. 4A.

It should be noted, however, that other implementations might allow extension of a number of fields of the message formats 400, 450A, and 480, a size of the fields, and a content of the fields while maintaining backward compatibility with older hardware. It should also be noted that some implementations might not use the C0 404, C1 406, S 408, and W 410 fields. Coexistence messages with specified message tags and no message body 582 and 584 might be transmitted to indicate sleep mode, to indicate that the device is awake, or to request wakeup. Referring back to FIG. 3, after the coexistence message is created, the Bluetooth serializer 104A converts the coexistence message into a serial format so that the coexistence message can be transmitted along a single data line (e.g., the data line 154 of FIG. 2A). The flow continues at block 308.

At block 308, the coexistence message is transmitted via the MCI. In one implementation, the Bluetooth serializer 104A may transmit the coexistence message to the WLAN deserializer 122B. In one example, the coexistence message may be transmitted along the data line 154 synchronous to the rising edge of the clock on the clock line 152. From block 308, the flow ends.

Figure 5:
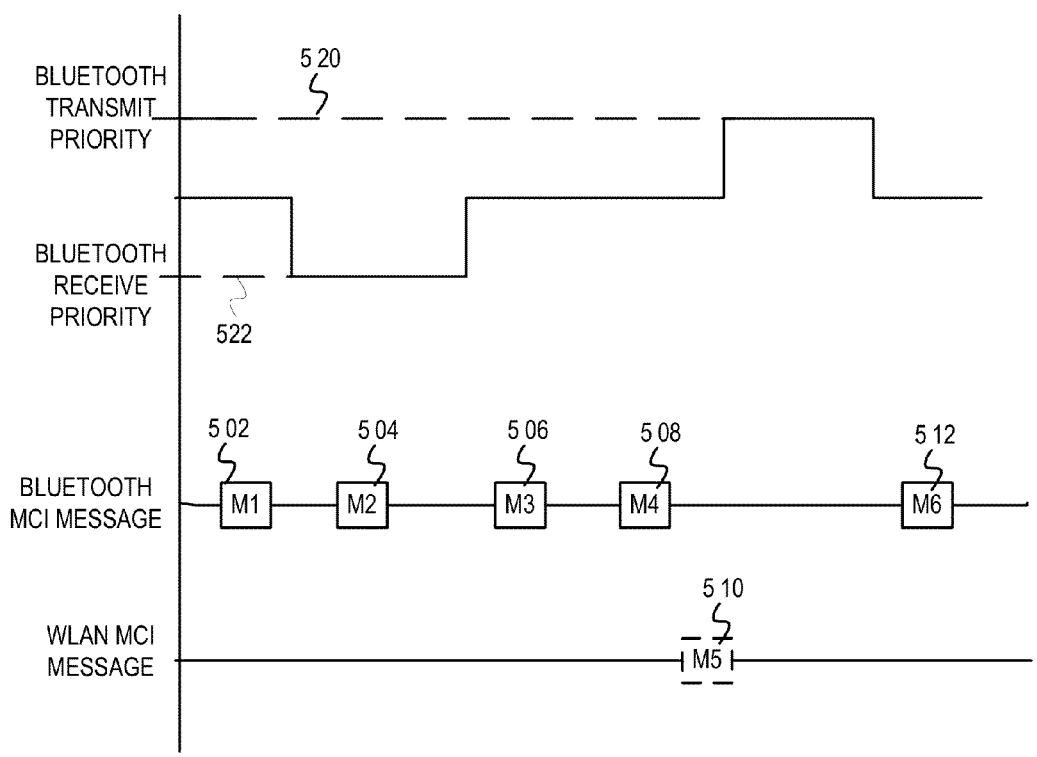
FIG. 5 illustrates an example exchange of various coexistence messages between a Bluetooth device and a WLAN device.

An example of various coexistence messages exchanged between the Bluetooth device 102 and the WLAN device 120 is illustrated in FIG. 5. In FIG. 5, level 520 indicates a priority of a Bluetooth packet transmission, while level 522 indicates a priority of a Bluetooth packet reception. The Bluetooth serializer 104A transmits message 502 to the WLAN device 120. The message 502 can comprise Bluetooth contention information notifying the WLAN device 120 of an expected receive packet. The message 502 can comprise priority of the expected receive packet. After the Bluetooth device 102 receives a header of the receive packet, the Bluetooth serializer 104A transmits message 504. The Bluetooth serializer 104A transmits message 506 after the Bluetooth device 102 receives the receive packet to indicate an end of the Bluetooth packet reception. The Bluetooth serializer 104A transmits message 508 to provide the contention information about an upcoming Bluetooth packet transmission. The WLAN serializer 122A may transmit message 510 if the Bluetooth device 102 is not allowed to initiate the Bluetooth packet transmission. In one implementation, the WLAN serializer 122A may be required to transmit the message 510 a predefined interval before a start time of the Bluetooth packet transmission. In one implementation, if the Bluetooth device 102 receives the message 510 after the start of the Bluetooth packet transmission, the Bluetooth device 102 may abort the Bluetooth packet transmission. The Bluetooth serializer 104A may transmit message 512 to indicate the end of the Bluetooth packet transmission. Messages may be transmitted to indicate a start and end of each packet (e.g., data packets, control packets such as Frequency Hopping Synchronization (FHS) packets and ID packets, etc.). The messages may be preserved until wake-up or until they are overwritten with a contention reset message.

Figure 6:
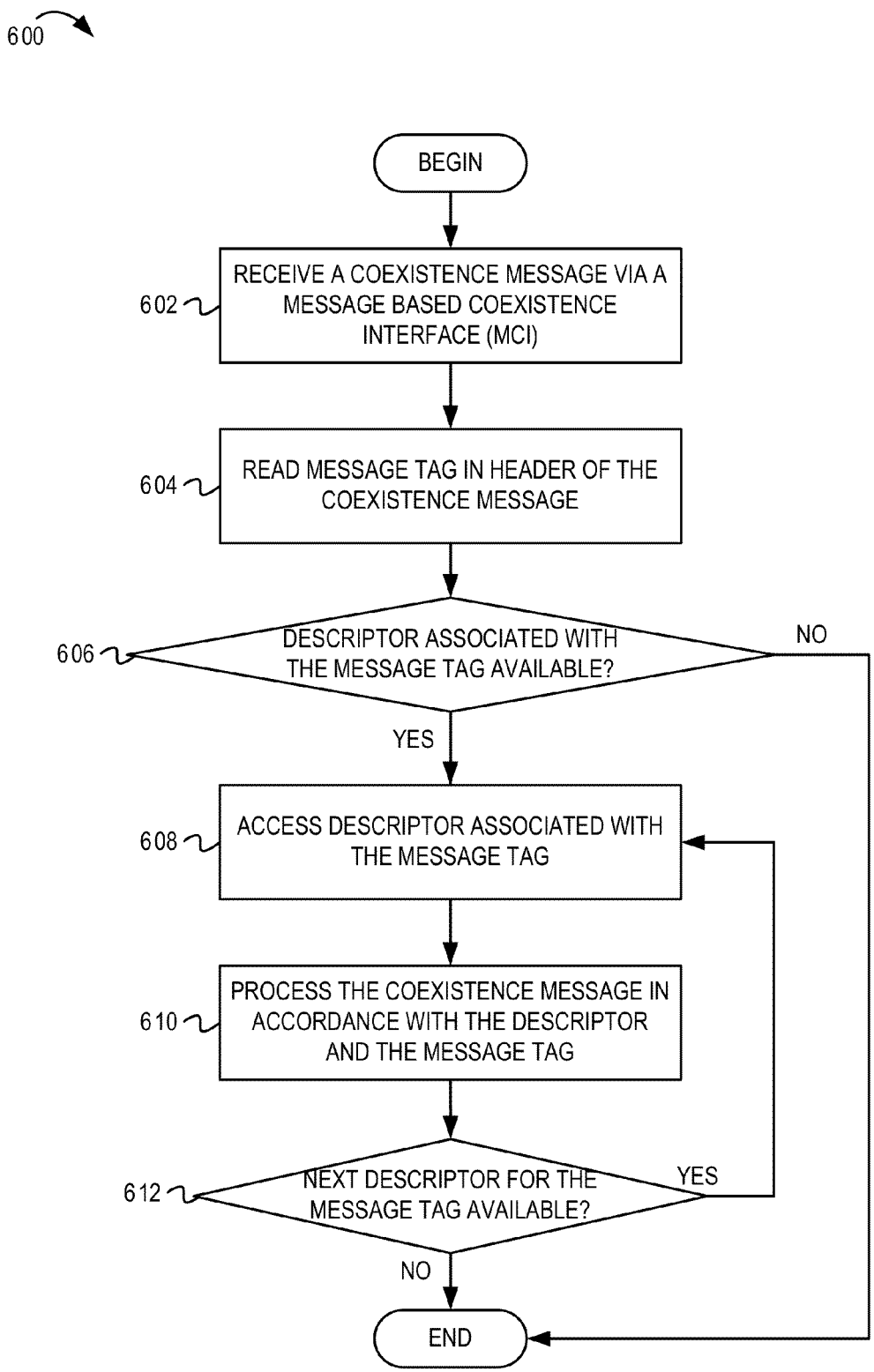
FIG. 6 is a flow diagram illustrating example operations for decoding a coexistence message received via a message based coexistence interface.

FIG. 6 is a flow diagram illustrating example operations for decoding a coexistence message received via a message based coexistence interface (MCI). Flow 600 begins at block 602.

At block 602, the coexistence message is received via the MCI. For example, a WLAN deserializer 122B of FIG. 2A may receive the coexistence message over a data line 154 from a Bluetooth serializer 104A. The flow continues at block 604.

At block 604, a message tag is read from a header of the coexistence message. In one implementation, the WLAN deserializer 122B may read the message tag from the coexistence message. In another implementation, a decoding unit separate from the WLAN deserializer 122B may read the message tag. The message tag can indicate a type and content of the coexistence message. For example, a message tag of 0101 may indicate that the coexistence message comprises scheduling information. As another example, a message tag of 1000 may indicate that the coexistence message comprises a general communication message. As another example, a message tag of 1001 may indicate that the coexistence message comprises low noise amplifier (LNA) gain information. The coexistence message can be in any one of the three formats described with reference to FIGS. 4A, 4B, and 4C. In some implementations, the coexistence message can be in any suitable message format. The flow continues at block 606.

Figure 7A:
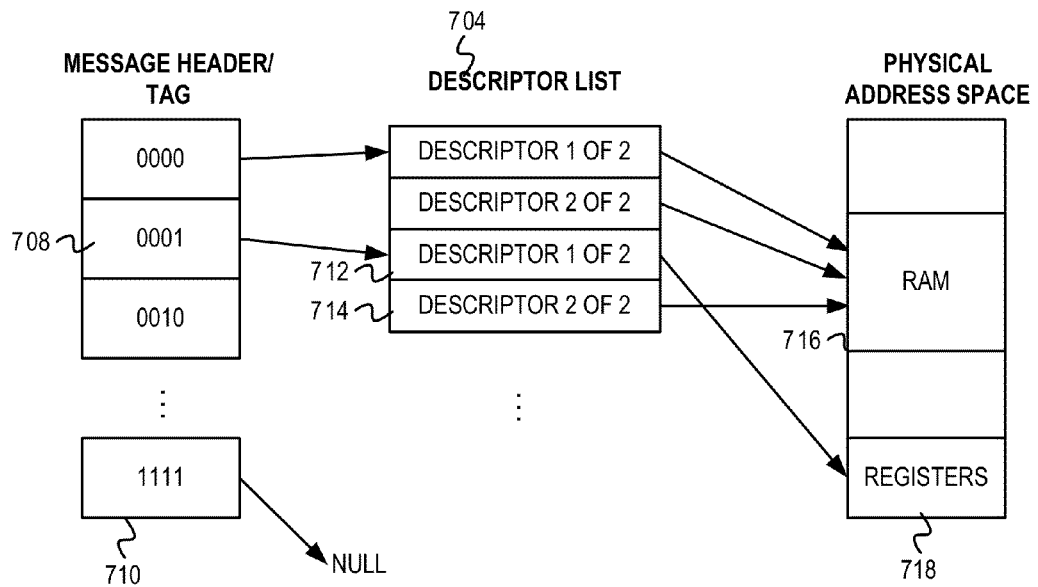
FIG. 7A is a conceptual diagram illustrating identifying and processing a descriptor associated with a message tag.

At block 606, it is determined whether a descriptor associated with the message tag is available. For example, the WLAN deserializer 122B may determine whether the descriptor associated with the message tag is available. In some implementations, the descriptor list 130 may be stored in register space and may be maintained by software. The descriptor may be a software instruction that indicates how the coexistence message should be consumed. Typically, the body of the coexistence message is written to a memory-mapped region in the WLAN device 120. The mapping is defined by the descriptor. For example, the descriptor may indicate that content of specified fields of the coexistence message should be retrieved. The descriptors may also indicate a location where the retrieved content should be stored. The process of identifying the descriptor associated with the message tag is illustrated in FIG. 7A. Availability of the descriptor associated with the message tag may be determined based on determining whether there exists a valid mapping from a table indexed by the messages tags to a descriptor list 704. The descriptor list 704 may be a lookup table comprising message tags and locations of the descriptors associated with the message tags. The message tag from the coexistence message may be used to lookup the WLAN descriptor list 704 to identify the descriptor associated with the message tag. For example, receiving the message tag 708 would trigger a lookup of the descriptor list 704 to determine a mapping for the message tag 708 with contents 0001. It may be determined that the message tag 708 maps to the descriptor 712 in the descriptor list 704. This may indicate that the message with the message tag 0001 will be decoded as dictated by the fields of descriptor 712.

Also, in some implementations, message tags (e.g., the message tag 710) may not be associated with any descriptors. For example, the message tag 710 would trigger a lookup of the descriptor list 704 to determine a mapping for the message tag with contents 1111. The message tag 710 points to NULL and, therefore, it may be determined that a descriptor associated with the message tag 710 is not available. In one implementation, the coexistence message that comprises the message tags that are not associated with descriptors may be discarded. In another implementation, such coexistence messages may be stored in a pre-defined location. Referring back to FIG. 6, if it is determined that the descriptor associated with the message tag is available, the flow continues at block 708. Otherwise, the flow ends.

Figure 7B:
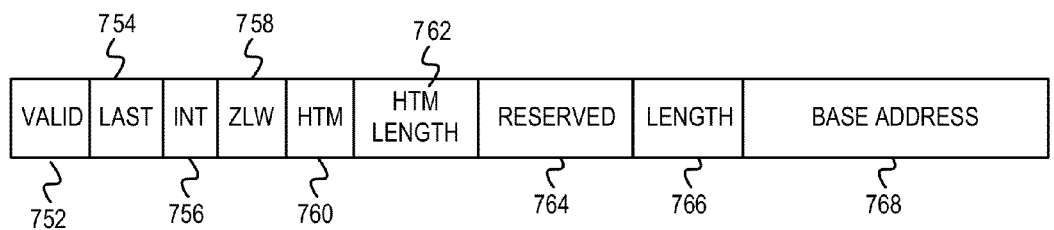
FIG. 7B illustrates an example format of a descriptor associated with a message tag.

At block 608, the descriptor associated with the message tag is accessed. For example, the WLAN deserializer 122B may access, from the WLAN descriptor list 130, the descriptor associated with the message tag. In some implementations, the WLAN deserializer 122B may determine a memory location of the descriptor from the WLAN descriptor list 130 and access descriptor from the memory location. An example format of the descriptor is illustrated in FIG. 7B. The descriptor 750 comprises a "valid" field 752, a "last" field 754, a "interrupt" field 756, a "zero length write (ZLW)" field 760, a "hardware triggered message (HTM)" field 762, an "HTM length" field 764, a reserved field 764, a "length" field 766, and a "base address" field 768.

The "valid" field 752 comprises one bit and indicates whether or not the descriptor and its fields are valid. In some implementations, the descriptor may be invalid if the valid field 752 is set to "0". The remainder of the coexistence message after the last valid descriptor is discarded. The "last" field 754 comprises one bit and indicates whether or not the descriptor is a last descriptor associated with the message tag. The message tag and hence the coexistence message may be associated with more than one descriptor. The descriptor list 130 of FIG. 1 may reference a first descriptor associated with the message tag, the first descriptor may implicitly reference a second descriptor associated with the message tag, and so on. This can indicate that consecutive descriptors from the descriptor list 704 are used until a descriptor with the "last" bit set (e.g., last bit=1) is encountered. As illustrated in FIG. 7A, the message tag 708 references the descriptor 712. The descriptor 712 implicitly references the descriptor 714, which is also associated with the message tag 708. The "last" field 754 in the descriptor 714 may be set to "1", to indicate that the descriptor 714 is the last descriptor in a descriptor chain associated with the message tag 708.

The "interrupt" field 756 comprises one bit and causes an interrupt to be triggered when the interrupt field 756 is set to "1". The content of the interrupt field 756 should be identical for all descriptors associated with a particular message tag. The ZLW field 758 comprises one bit and indicates that a write to the base address 768 should be generated even if the length field 766 is zero. A pre-defined set of characters may be written to the base address 768 if the length field 766 is zero.

The HTM field 760 comprises one bit and indicates that the descriptor should be used for receiving hardware-triggered messages. In some implementations, the HTM length field 762 may be valid only if the HTM field 760 is set (i.e., HTM=1). The HTM length field 762 can indicate a length (in bytes) of the body of the hardware triggered messages that the WLAN deserializer 122B should decode before accessing a next descriptor associated with the message tag.

The length field 766 indicates a number of 32 bit words of the coexistence message to be written to a physical address space (indicated by the base address field 768) before accessing the next descriptor associated with the message tag. When the HTM field 760 is set, the length field 766 should be less than or equal to the HTM length field 762. The base address field 768 specifies a physical base address starting from which all/part of the coexistence message body is written to the physical address space. An address offset if specified in the coexistence message (e.g., the address offset 454 of FIG. 4B) may be added to the base address field 768 to generate the physical base address.

It should be noted that the descriptor format of FIG. 7B is an example descriptor format. Descriptors may be in any suitable format depending on the message tags associated with the descriptors. For example, a descriptor format might consist of one 32-bit base address. The base address, if set to 0, might indicate that the "valid" field is 0. The base address, if not equal to zero, might implicitly indicate certain other predefined values (e.g., the "valid" field might be set to 1, the "last" field might be 1, the "INT" field might be set to 1, the "ZLW" and "HTM Length" fields may be ignored, the "HTM" field might be set to 0, and the "Length" field might be set to 4). As another example, a descriptor format might consist of one "valid" bit, with other fields assuming predefined values. In other words, a set of one or more message tags may be allocated to different descriptor formats. For example, a first set of message tags may be decoded using descriptors in the descriptor format of FIG. 7B. A second set of message tags may be decoded using descriptors in a different descriptor format. Referring back to FIG. 6, after the descriptor associated with the message tag is accessed, the flow continues at block 610.

At block 610, the coexistence message is processed in accordance with the descriptor and the message tag. As described with reference to FIG. 608, different message tags may be associated with different descriptor formats. Therefore, the descriptor in conjunction with the message tag may determine how the coexistence message will be processed. The message tag can indicate which format of the descriptor should be used and also which descriptor (from the descriptor list 704) should be used to decode the coexistence message. For example, the WLAN deserializer 122B may retrieve all/part of the coexistence message body as indicated by the descriptor and store the retrieved part of the coexistence message body. Referring to FIG. 7A, the descriptor 712 associated with the message tag 708 may indicate (e.g., in the length field 766 of FIG. 7B) that e.g., a first set of three 32-bit words of the coexistence message comprising the message tag 708 should be stored in a register in the register space 718. The descriptor 714 associated with the message tag 708 may indicate that the remainder of the coexistence message comprising the message tag 708 should be stored in memory location 5000 in RAM 716.

Typically, the Bluetooth device 102 might not determine how the WLAN deserializer 122B will receive, store, or use the information in the coexistence message. The WLAN deserializer 122B may determine how the coexistence message should be processed based on the capabilities of the WLAN device 120. As an example, the WLAN deserializer 122B may receive the coexistence message in the message format 450C of FIG. 4B, and may store various fields (e.g., priority 466, channel ID 470, etc.) at various memory locations depending on the content of the descriptors associated with a message tag of the coexistence message. The coexistence message may comprise an address offset field 454 that defines a location of scheduling information in a coexistence scheduling table maintained by the WLAN device 120. The timestamps 456 and 458 may indicate a start time and a stop time of a Bluetooth packet communication, respectively, and may also be stored in the location indicated by the address offset field 454 and by the descriptor associated with a message tag of the scheduling information message.

In some implementations, the WLAN deserializer 122B may store part/all of the coexistence message in various locations as indicated by the descriptors associated with the message tag in the coexistence message. As mentioned earlier, the descriptors associated with the message tag may be platform-dependent. The descriptors may indicate a location where the content of the coexistence message should be stored based on content of the coexistence message (e.g., indicated by the message tag and the fields {C0, C1}). For example, the message tag may be associated with only one descriptor that indicates that priority information in the coexistence message should be stored in the RAM. As another example, the message tag may be associated with two descriptors—one descriptor may indicate that RSSI information in the coexistence message should be stored in a specified location in the RAM to be consumed by software, and another descriptor may indicate that the RSSI information should be stored in a specified register to be consumed by a state machine. A coexistence agent or other processing unit may access the memory location (or the register), retrieve, and accordingly process the RSSI information. In another implementation, the memory location or register in which the content of the coexistence message is stored, as indicated by the descriptors, may be a location of the scheduling table. In other words, the WLAN deserializer 122B may directly populate the scheduling table in accordance with the descriptors. For example, the WLAN deserializer 122B may map the coexistence message to software (e.g., RAM) if the WLAN device 120 comprises a software-implemented scheduling table. WLAN firmware may interpret the coexistence message while scheduling WLAN transmit and receive operations. As another example, the WLAN deserializer 122B may map the coexistence message to hardware (e.g., MAC) based scheduling table. The MAC can analyze the coexistence message and schedule WLAN communications according so as to avoid interference with Bluetooth communications. After the WLAN deserializer 122B processes the coexistence message in accordance with the descriptor, the flow continues at block 612.

At block 612, it is determined whether a next descriptor associated with the message tag is available. For example, the WLAN deserializer 122B may access the WLAN descriptor list 130 to determine whether the next descriptor associated with the message tag is available. The WLAN deserializer 122B may read the last field 754 of FIG. 7B of a current descriptor to determine whether the current descriptor is the last descriptor associated with the message tag. If the last field 754 in the current descriptor is set to "0", the WLAN deserializer 122B may identify the next descriptor associated with the message tag. If it is determined that the next descriptor associated with the message tag is available, the flow continues at block 608 where the next descriptor is accessed and the coexistence message is processed in accordance with the next descriptor. The process continues for each descriptor associated with the message tag. The flow ends after it is determined that the current descriptor associated with the message tag is not available (e.g., based on determining that the "last" bit in the descriptor is set).

It should be understood that the depicted flow diagrams (FIGS. 3 and 6) are examples meant to aid in understanding embodiments and should not be used to limit embodiments or limit scope of the claims. Embodiments may perform additional operations, fewer operations, operations in a different order, operations in parallel, and some operations differently. For example, although FIG. 7A depicts each message tag being associated with two descriptors, the message tag can be associated with any suitable number of descriptors. A message tag may be associated with a single descriptor or more than two descriptors. In some implementations, the message tag may not be associated with any descriptors. Also, although examples refer to exchange of coexistence messages from the Bluetooth device 102 to the WLAN device 120, coexistence messages may also be transmitted from the WLAN device 120 to the Bluetooth device 102. For example, the WLAN serializer 122A of FIG. 2A may transmit the coexistence messages to the Bluetooth deserializer 104B. The WLAN serializer 104A can transmit coexistence scheduling information and information about currently received WLAN packets to the Bluetooth deserializer 104B, which in turn can transmit the WLAN scheduling information to a Bluetooth scheduler.

Also, although FIGS. 1-7 describe using the MCI and the coexistence messages to exchange coexistence information between the Bluetooth device 102 and the WLAN device 120, in some implementations the MCI and the coexistence messages may not be used to enable coexistence. In other words, the MCI may be used for applications beyond coexistence.

In some implementations, the Bluetooth device 102 and the WLAN device 120 may use the MCI to share a front end, share an antenna, share a receive panel, etc. For example, while sharing a receive panel, the Bluetooth device 102 and the WLAN device 120 may need to communicate their differences in modulation, receive signal strength, etc. to ensure that received signals do not get saturated or fall below threshold RSSI values. If the Bluetooth device 102 is receiving a Bluetooth packet, the Bluetooth device 102 can indicate that the WLAN device 120 should not start receiving a WLAN packet. As another example, the MCI may be used for exchange of debugging information between the Bluetooth device 102 and the WLAN device 120 or between either Bluetooth device 102 or the WLAN device 120 and an external debugging tool. As another example, the Bluetooth device 102 may transmit data, for further processing, to the WLAN device 120 via the MCI. The WLAN device in turn, can transmit the data received from the Bluetooth device 102 to a host device via a secure digital input output (SDIO), a serial peripheral interface (SPI), a peripheral component interconnect (PCI) bus, PCI-Express (PCI-E) bus or other host interface on the WLAN device 120. As another example, a processing unit may be located only on the WLAN device 120. Bluetooth data to be processed may be transmitted from the Bluetooth device 102 to the WLAN device 120 via the MCI.

It should also be noted that although FIG. 1 depicts the serializer/deserializer units 104 and 122 connected respectively to the link controller 106 and the MAC unit 124, in some implementations, the serializer/deserializer units 104 and 122 might be connected to other components of the Bluetooth device 102 and the WLAN device 120 respectively. For example, a real time clock (RTC) unit (on either the Bluetooth device 102 or the WLAN device 120) may generate a sleep state signal to indicate, respectively to the serializer/deserializer units 104 and 122, changes in sleep state. The sleep state signal may trigger transmission of an MCI message. As another example, the serializer/deserializer units 104 and 122 may be connected to a baseband processing unit. Additionally, although FIGS. 1-7 describe operations of the Bluetooth device 102 creating the coexistence message and the WLAN device 120 processing the coexistence message, in other implementations, the WLAN device 120 can create the coexistence message and the Bluetooth device 102 may process the coexistence message.

Lastly, it should also be noted that when the WLAN device 120 is in an inactive state (i.e., sleep mode), the Bluetooth device 102 might continue to transmit coexistence messages to the WLAN device 120. In other implementations, however, the Bluetooth device 102 may transmit only select messages when the WLAN device 120 is in the inactive state. The WLAN device 120 may not react to the coexistence messages while the WLAN device 120 is in the inactive state, but may process the coexistence messages once the WLAN device 120 returns to an active state. In other implementations, however, the WLAN device 120 may process some coexistence messages while in the inactive state, and ignore other coexistence messages or process the other coexistence messages on returning to the active state. Likewise, the WLAN device 120 may also transmit coexistence message to the Bluetooth device 102, while the Bluetooth device is in the inactive state. In one example, the WLAN device 120 may preserve a contention information message received from the Bluetooth device 102 while the WLAN device is in the inactive state. On returning to the active state, the WLAN device 120 may analyze the contention information message to determine a Bluetooth communication schedule.

Figure 8:
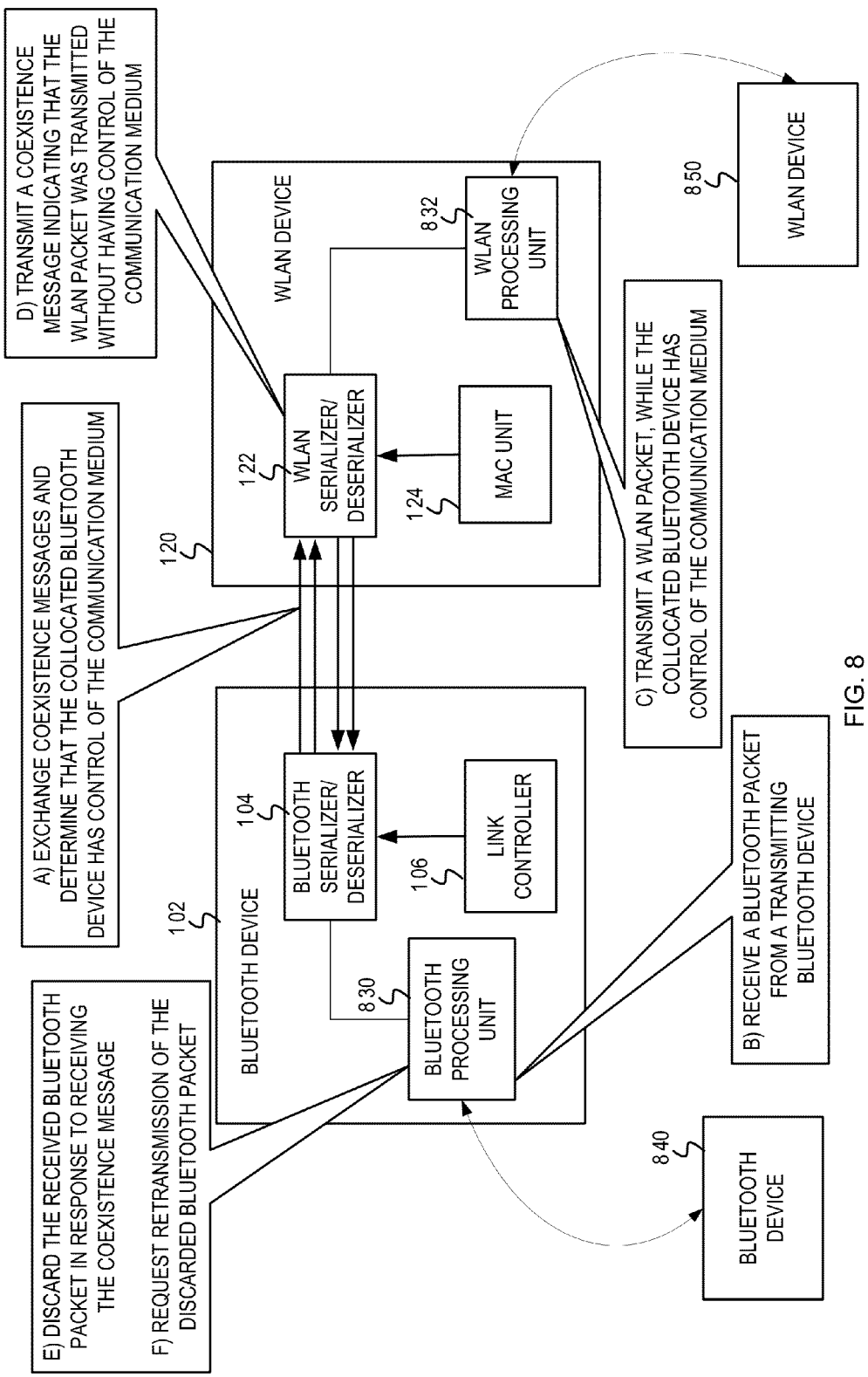
FIG. 8 is an example block diagram illustrating a mechanism for detecting interference between co-located wireless network devices.

FIG. 8 is an example block diagram illustrating a mechanism for detecting interference between co-located wireless network devices. FIG. 8 depicts the Bluetooth device 102 collocated with the WLAN device 120. As described in FIG. 1, the Bluetooth device 102 and the WLAN device 120 may be collocated on a common system (e.g., on the same circuit board, on distinct circuit boards within the same system, etc.). In other embodiments, the Bluetooth device 102 and the WLAN device 120 can be embedded on the same chip (e.g., a system on a chip (SoC), an integrated circuit, etc.). For simplicity, FIG. 8 depicts only some of the components of the Bluetooth device 102 and the WLAN device 120 of FIG. 1. Additionally, the Bluetooth device 102 comprises a Bluetooth processing unit 830 and the WLAN device 120 comprises a WLAN processing unit 832. In some embodiments, the Bluetooth processing unit 830 can comprise one or more antennas, an analog front end (AFE), a baseband processing unit, a CPU, a memory unit, and other components for processing data bits into Bluetooth packets, extracting data bits from received Bluetooth packets, communicating with other Bluetooth devices, etc. In some embodiments, the WLAN processing unit 832 can comprise one or more antennas, an analog front end (AFE), a baseband processing unit, a CPU, a memory unit, and other components for processing data bits into WLAN packets, extracting data bits from received WLAN packets, communicating with other WLAN devices, etc. The Bluetooth processing unit 830 is coupled to the Bluetooth serializer/deserializer 104. The WLAN processing unit 832 is coupled to the WLAN serializer/deserializer 122, which is coupled to the Bluetooth serializer/deserializer 104. The Bluetooth device 102 and the WLAN device 120 can be configured to exchange coexistence messages to indicate unscheduled transmissions when the Bluetooth device 102 and the WLAN device 120 do not have control of the communication medium, as will be described with reference to stages A-E of FIG. 8 and in FIGS. 9-11

At stage A, the Bluetooth serializer/deserializer 104 and the WLAN serializer/deserializer 122 exchange coexistence messages and determine that the collocated Bluetooth device 102 has control of the communication medium. In one implementation, as described with reference to FIGS. 1-5, the Bluetooth serializer 104A and the WLAN serializer 122A of FIG. 2A exchange scheduling-based coexistence messages to indicate, to the WLAN device 120 and the Bluetooth device 102, respectively, a type of communication, a priority of the communication, a duration of the communication, etc. The Bluetooth device 102 (e.g., the link controller 106) and the WLAN device 120 (e.g., the MAC unit 124) analyze the coexistence messages and determine whether the Bluetooth device 102 or the WLAN device 120 should gain control of the communication medium to transmit/receive their respective packets. Based on the scheduling-based coexistence messages, one of the collocated wireless network devices (e.g., either the Bluetooth device 102 or the WLAN device 120) can gain control of the communication medium to prevent communication of one wireless network device from being corrupted by communication of the collocated wireless network device (e.g., to prevent Bluetooth packet reception from being corrupted by WLAN packet transmission). In the example shown in FIG. 8, the Bluetooth device 102 gains control of the communication medium for transmitting/receiving Bluetooth packets to/from other wireless network devices. For example, the Bluetooth device 102 communicates with a Bluetooth device 840.

At stage B, the Bluetooth processing unit 830 of the Bluetooth device 102 receives a Bluetooth packet from a transmitting Bluetooth device 840. The Bluetooth packet may be a Synchronous Communication (SCO) packet, an extended SCO (eSCO) packet, an asynchronous communication link (ACL) packet, etc.

At stage C, the WLAN processing unit 832 of the WLAN device 120 transmits a WLAN packet, while the collocated Bluetooth device 102 has control of the communication medium. It is noted that if the WLAN device 120 does not have control of the communication medium, the WLAN device 120 may be prevented from initiating new transmissions. Although the WLAN device 120 does not have control of the communication medium, the WLAN device 120 can continue to listen and receive WLAN packets via the communication medium so that the WLAN device 120 does not ignore packets transmitted from other WLAN network devices. As part of packet reception, if the WLAN device 120 receives a packet from a WLAN device 850, the WLAN device 120 transmits an acknowledgement (ACK) packet. In accordance with WLAN communication protocols, the WLAN device 120 is required to transmit the ACK packet within a predefined time interval after receiving a packet from the WLAN device 850 to preclude the WLAN device from retransmitting the packet at a lower modulation rate (e.g., a slower packet transmit rate). Transmission of the ACK packet when the WLAN device 120 does not have control of the communication medium can cause the Bluetooth device 102 to incorrectly receive a Bluetooth packet. For example, if the WLAN device 120 transmits the ACK packet at the same time as the collocated Bluetooth device 102 receives the Bluetooth packet (described at stage B), the Bluetooth packet received by the Bluetooth device 102 can be corrupted.

At stage D, the WLAN serializer/deserializer 122 transmits a coexistence message indicating that the WLAN packet was transmitted without having control of the communication medium. In some implementations, the WLAN processing unit 832 can notify the WLAN serializer/deserializer 122 that the WLAN packet was transmitted. The WLAN serializer/deserializer 122 can determine that the WLAN packet was transmitted without control of the communication medium and can transmit a "transmission without medium access (TXWOMA)" coexistence message. In another implementation, as described above, the CPU 126 of the WLAN device 120 may transmit a notification to the WLAN serializer/deserializer 122 indicating that the content of the TXWOMA coexistence message is stored in a specified memory location. Accordingly, the WLAN serializer/deserializer 122 may access the specified memory location, generate the TXWOMA coexistence message, and transmit the TXWOMA coexistence message to the Bluetooth serializer/deserializer 104. In another implementation, the WLAN serializer/deserializer 122 may generate the TXWOMA coexistence message based on WLAN coexistence signals received from the MAC unit 124. The WLAN serializer/deserializer 122 transmits the TXWOMA coexistence message to the Bluetooth serializer/deserializer 104 via a coexistence messaging system. In one implementation, the coexistence messaging system can be a message-based coexistence interface (MCI) and the TXWOMA coexistence message can be generated as described with reference to FIGS. 4A-4C. In another implementation, the coexistence messaging system can be a set of one or more PTA wires and the TXWOMA coexistence message can be transmitted by transmitting a high voltage level on one or more of the PTA wires. In some implementations, prior to transmitting the TXWOMA coexistence message, the WLAN serializer/deserializer 122 may determine whether the Bluetooth device 102 was receiving a Bluetooth packet. The WLAN serializer/deserializer 122 may transmit the TXWOMA coexistence message on determining that the WLAN packet was transmitted while the Bluetooth device 102 was receiving a Bluetooth packet. The WLAN serializer/deserializer 122 may not transmit the TXWOMA coexistence message on determining that the WLAN packet was transmitted while the Bluetooth device 102 was idle. In other implementations, the WLAN serializer/deserializer 122 can transmit the TXWOMA coexistence message whenever the WLAN processing unit 832 transmits a WLAN packet without control of the communication medium.

At stage E, the Bluetooth processing unit 830 discards the received Bluetooth packet in response to receiving the TXWOMA coexistence message from the WLAN serializer/deserializer 122. In some implementations, the Bluetooth serializer/deserializer 104 may process the TXWOMA coexistence message and may determine whether to request retransmission of the Bluetooth packet. In other implementations, the Bluetooth serializer/deserializer 104 may receive the TXWOMA coexistence message and may relay the TXWOMA coexistence message to other processing components (e.g., the Bluetooth processing unit 830) of the Bluetooth device 102. In one implementation, the Bluetooth serializer/deserializer 104 can receive the TXWOMA coexistence message and can provide an indication of the TXWOMA coexistence message to the Bluetooth processing unit 830. The Bluetooth processing unit 832, in turn, can determine whether to request a retransmission of the Bluetooth packet. In another implementation, the Bluetooth serializer/deserializer 104 can receive the TXWOMA coexistence message and can provide an indication of the TXWOMA coexistence message to the Bluetooth link controller 106. The Bluetooth link controller 106 can determine that the received Bluetooth packet may potentially be corrupted, and can direct the Bluetooth processing unit 830 to request a retransmission of the Bluetooth packet.

At stage F, the Bluetooth processing unit 830 requests retransmission of the discarded Bluetooth packet. In one implementation, the Bluetooth processing unit 830 can transmit a negative acknowledgement (NACK) packet to the transmitting Bluetooth device 840 to indicate improper reception of the Bluetooth packet. Accordingly, the transmitting Bluetooth device 840 can retransmit the discarded Bluetooth packet. In other implementations, the Bluetooth processing unit 830 may not transmit any response (i.e., may not transmit the NACK packet) to the transmitting Bluetooth device 840. The transmitting Bluetooth device 840 may assume (e.g., after waiting for a predefined period of time) that the Bluetooth device 102 has not received the Bluetooth packet and may automatically retransmit the Bluetooth packet.

It is noted that although FIG. 8 depicts the Bluetooth device 102 having control of the communication medium and the WLAN serializer/deserializer 122 transmitting the TXWOMA coexistence message to the Bluetooth device 102, embodiments are not so limited. In some implementations, the Bluetooth serializer/deserializer 104 can be configured to transmit the TXWOMA coexistence message when the WLAN device 120 has control of the communication medium and the Bluetooth device 102 transmits a packet without control of the communication medium. In other words, either collocated wireless network device that transmits a packet without control of the communication medium may transmit the TXWOMA coexistence message to other collocated wireless network devices.

Figure 9:
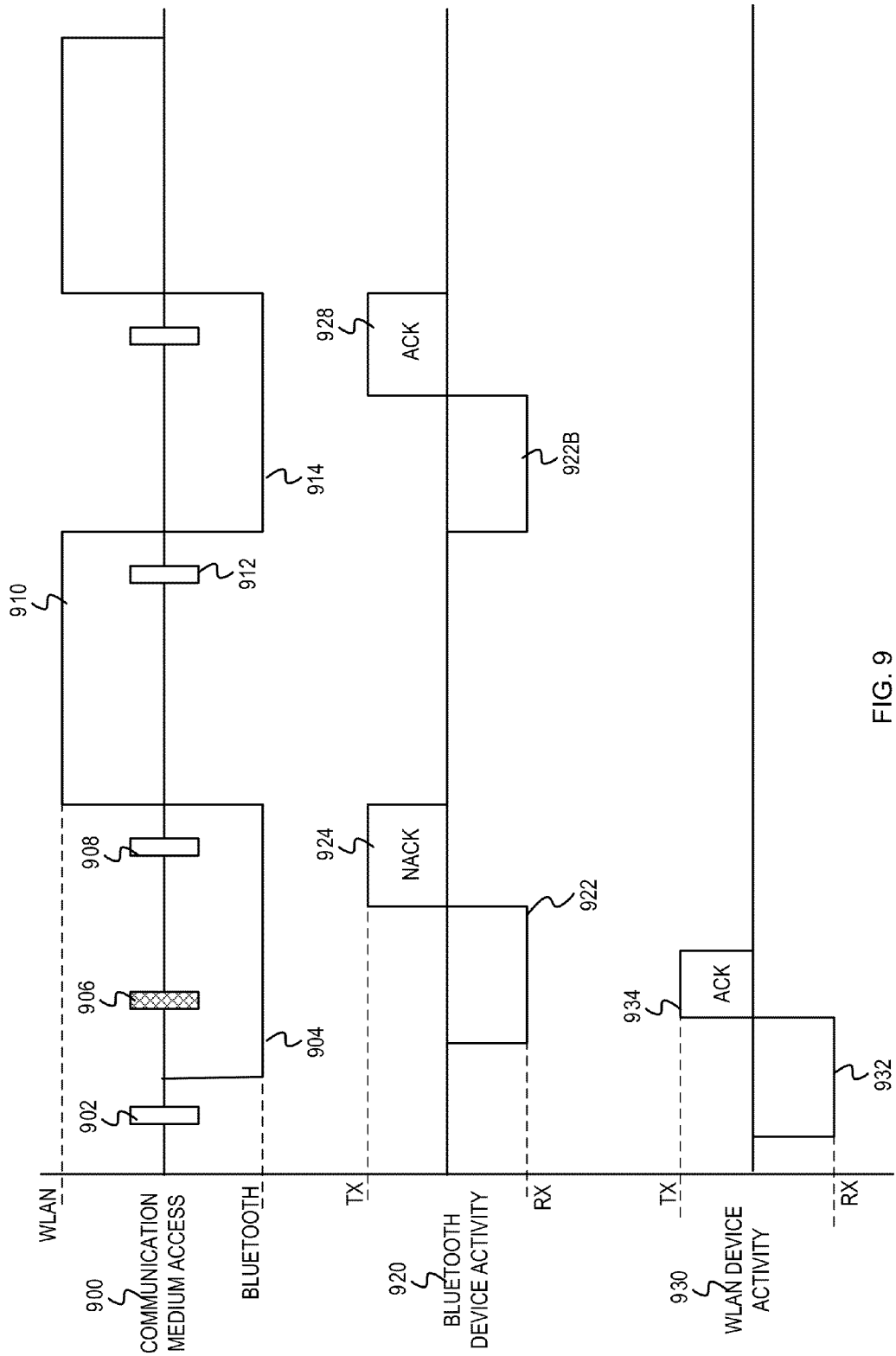
FIG. 9 is a sequence diagram illustrating transmission of coexistence messages to indicate interference between co-located wireless network devices.

FIG. 9 is a sequence diagram illustrating coexistence message transmission to indicate potential interference between co-located wireless network devices. FIG. 9 depicts a graph 900 of communication medium access (e.g., whether the Bluetooth device 102 or the WLAN device 120 has control of the communication medium). FIG. 9 also depicts a graph 920 of Bluetooth device activity and a graph 930 of WLAN device activity. In one example, the Bluetooth device 102 of FIG. 8 and the WLAN device 120 of FIG. 8 exchange a scheduling-based coexistence message 902 and determine that the Bluetooth device 102 has control of the communication medium (as illustrated by segment 904 in the graph 900). Consequently, the Bluetooth device 102 begins receiving Bluetooth packet 922. As described above, although the WLAN device 120 does not have control of the communication medium, the WLAN device 120 can receive the WLAN packet 932 when the Bluetooth device 102 has control of the communication medium. In response to receiving the WLAN packet 932, the WLAN device 120 transmits an acknowledgement (ACK) packet 934 while the Bluetooth device 102 is receiving the Bluetooth packet 922. The WLAN device transmits a TXWOMA coexistence message 906 (depicted as a cross-hatched box) via a coexistence interface. The TXWOMA coexistence message 906 indicates possible unreliability of the received Bluetooth packet 922 due to an unscheduled WLAN packet transmission. On receiving the TXWOMA coexistence message 906, the Bluetooth device 102 transmits a NACK packet 924 to the transmitting Bluetooth device 840. The Bluetooth device 102 and the WLAN device 120 exchange a scheduling-based coexistence message 908 and the WLAN device 120 gains control of the communication medium as illustrated by segment 910 in the graph 900. When coexistence message 912 is exchanged, the Bluetooth device 102 gets control of the communication medium again as illustrated by segment 914 in the graph 900. In response to transmitting the NACK packet 924, the Bluetooth device 102 now receives packet 922B. The packet 922B is a retransmission of the discarded packet 922. Because the Bluetooth device 102 does not receive another TXWOMA coexistence message, the Bluetooth device 102 transmits an ACK packet 928 to indicate that the retransmitted packet 922B was successfully received. It is noted that the Bluetooth device 102 can process the packet 922B to determine whether the packet 922B was correctly received (e.g., by performing CRC error detection techniques) prior to transmitting either the ACK packet (if no errors are detected) or a NACK packet (if errors are detected).

Figure 10:
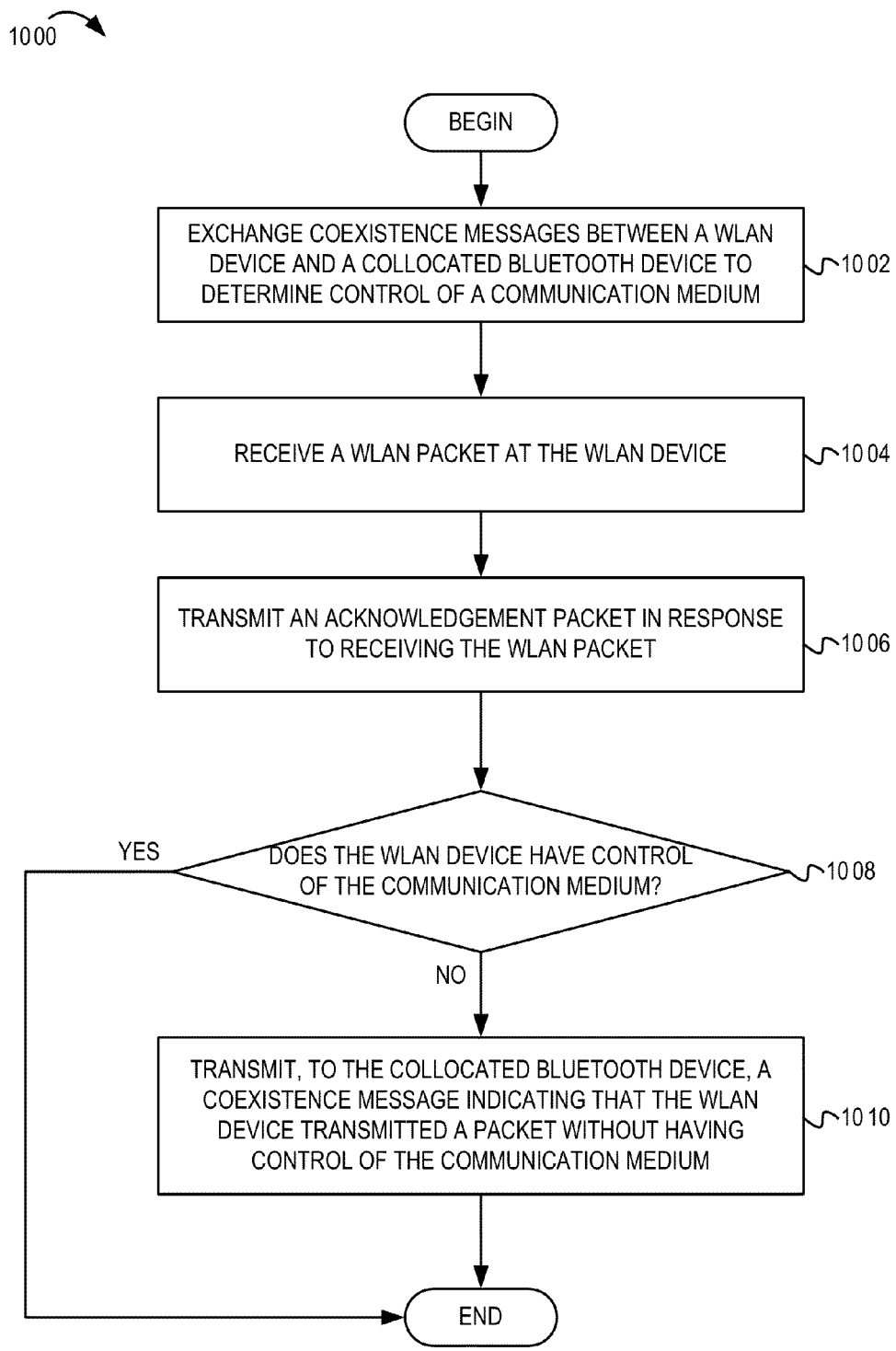
FIG. 10 is a flow diagram illustrating example operations for indicating packet transmission without communication medium access.

FIG. 10 is a flow diagram ("flow") illustrating example operations for indicating packet transmission without communication medium access. The flow 1000 begins at block 1002.

At block 1002, coexistence messages are exchanged between a WLAN device and a collocated Bluetooth device to determine control of a communication medium. For example, with reference to FIG. 8, a WLAN serializer/deserializer 122 of the WLAN device 120 exchanges scheduling-based coexistence messages with a Bluetooth serializer/deserializer 104 of the Bluetooth device 102 via a coexistence interface (e.g., an MCI interface). The flow continues at block 1004.

At block 1004, a WLAN packet is received at the WLAN device. For example, the WLAN processing unit 832 of FIG. 8 receives the WLAN packet from the WLAN device 850 of FIG. 8. It is noted that the WLAN device 120 may continuously listen for packets on the communication medium and may receive WLAN packets via the communication medium irrespective of whether the WLAN device 120 has control of the communication medium. The flow continues at block 1006.

At block 1006, an acknowledgement (ACK) packet is transmitted in response to receiving the WLAN packet. For example, the WLAN processing unit 832 transmits the ACK packet in response to receiving the WLAN packet from the WLAN device 850. Typically, on receiving the WLAN packet, the WLAN processing unit 832 transmits the ACK packet within a predefined ACK window to inform the WLAN device 850 that the packet was correctly received, and to preclude the WLAN device 850 from retransmitting the WLAN packet at a lower modulation rate. The flow continues at block 1008.

At block 1008, it is determined whether the WLAN device has control of the communication medium. For example, the WLAN serializer/deserializer 122 determines whether the WLAN device 120 has control of the communication medium. The WLAN serializer/deserializer 122 can determine whether the WLAN device 120 has control of the communication medium in response to detecting or receiving a notification of the transmitted WLAN packet. Transmitting the WLAN packet without having control of the communication medium can cause corruption of packets being received by other collocated devices (e.g., the collocated Bluetooth device 102). If it is determined that the WLAN device 120 has control of the communication medium, the flow ends and the WLAN device 120 does not indicate transmission of the WLAN packet to the collocated Bluetooth device 102. However, if it is determined that the WLAN device 120 does not have control of the communication medium, the flow continues at block 1010.

At block 1010, a coexistence message indicating that the WLAN device transmitted a packet without having control of the communication medium is transmitted to the collocated Bluetooth device. For example, the WLAN serializer/deserializer 122 transmits a TXWOMA coexistence message 906 (shown in FIG. 9) to the Bluetooth device 102 to indicate that the WLAN device 120 transmitted a WLAN packet without control of the communication medium. In one implementation, the WLAN serializer/deserializer 122 can receive a software trigger or a hardware trigger (similarly as described above) for creating the TXWOMA coexistence message 906 from the WLAN processing unit 832. The WLAN processing unit 832 may indicate one or more memory locations from which the WLAN serializer/deserializer 122 should retrieve content of the TXWOMA coexistence message 906. The WLAN serializer/deserializer 122, in turn, can access the one or more memory locations and retrieve the content of the TXWOMA coexistence message 906. The WLAN serializer/deserializer 122 can generate the TXWOMA coexistence message 906 by encapsulating the content of the TXWOMA coexistence message in a suitable header and can then transmit the TXWOMA coexistence message 906 to the Bluetooth device 102. In another implementation, the WLAN serializer/deserializer 122 can directly receive the content of the TXWOMA coexistence message 906 from the WLAN processing unit 832 or from a hardware component of the WLAN device 120 (e.g., the MAC unit 124). The WLAN serializer/deserializer 122 can accordingly generate the TXWOMA coexistence message 906 and transmit the TXWOMA coexistence message 906 to the Bluetooth device 102.

In some implementations, the WLAN serializer/deserializer 122 can generate the TXWOMA coexistence message 906 as described in accordance with FIGS. 4A-4C. For example, the WLAN serializer/deserializer 122 can transmit a predefined sequence in the message body 460 of FIG. 4B to indicate that WLAN device 120 transmitted a WLAN packet without control of the communication medium. As another example, the WLAN serializer/deserializer 122 can transmit a start time 462 in the message body 460 of FIG. 4B to indicate a time instant at which the WLAN device 120 began transmitted the WLAN packet without control of the communication medium. The Bluetooth device 102 can accordingly discard any Bluetooth packets that were received when the WLAN packet was transmitted, as will be described in FIG. 11. From block 1010, the flow ends.

Although not depicted in FIG. 10, it is noted that in some implementations, the WLAN device 120 may have control of the communication medium and the Bluetooth device 102 may transmit the TXWOMA coexistence message to the WLAN device 120 to indicate transmission of a Bluetooth packet without control of the communication medium. In one implementation, the Bluetooth processing unit 830 (or the link controller 106) can transmit the TXWOMA coexistence message to the WLAN device 120 to indicate transmission of a Bluetooth packet without control of the communication medium. In another implementation, the Bluetooth processing unit 830 (or the link controller 106) can communicate transmission of the Bluetooth packet without control of the communication medium to the Bluetooth serializer/deserializer 104. The Bluetooth serializer/deserializer 104, in turn, can generate and transmit the TXWOMA coexistence message to the WLAN device 120. In another implementation, the Bluetooth serializer/deserializer 104 can detect transmission of the Bluetooth packet without control of the communication medium and can accordingly generate and transmit the TXWOMA coexistence message.

Figure 11:
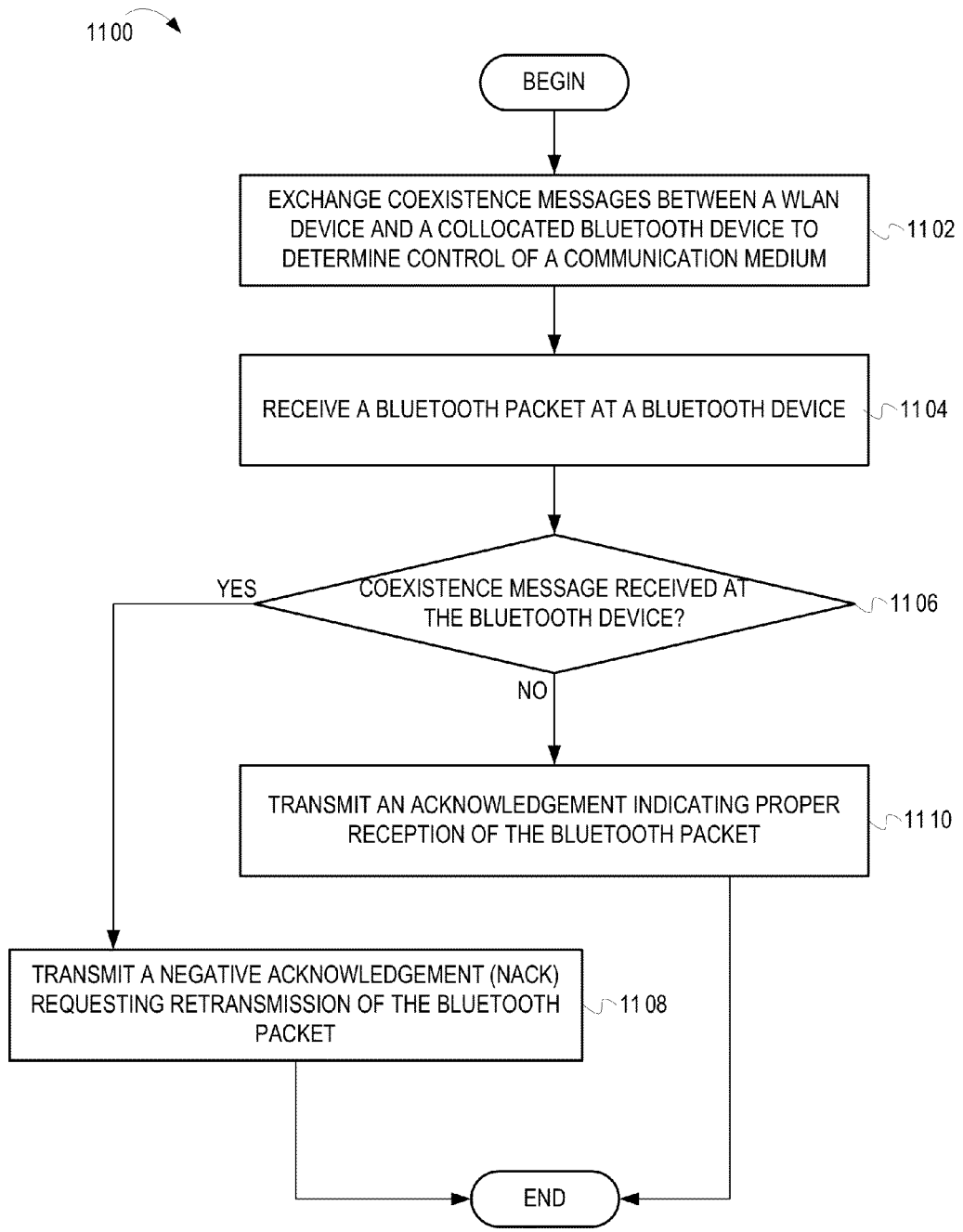
FIG. 11 is a flow diagram illustrating example operations for processing a coexistence message indicating transmission without communication medium access.

FIG. 11 is a flow diagram illustrating example operations for processing a coexistence message indicating packet transmission without communication medium access. The flow 1100 begins at block 1102.

At block 1102, coexistence messages are exchanged between a Bluetooth device and a collocated WLAN device to determine control of a communication medium. With reference to the example of FIG. 8, a Bluetooth serializer/deserializer 104 of the Bluetooth device 102 can exchange scheduling-based coexistence messages with a WLAN serializer/deserializer 122 of the WLAN device 120 via a coexistence interface (e.g., an MCI interface). In one example, the Bluetooth device 102 and the WLAN device 120 determine that the Bluetooth device 102 has control of the communication medium. The flow continues at block 1104.

At block 1104, a Bluetooth packet is received at the Bluetooth device. For example, in FIG. 8, the Bluetooth processing unit 830 of the Bluetooth device 102 receives the Bluetooth packet. The flow continues at block 1106.

At block 1106, it is determined whether a coexistence message indicating transmission without medium access was received at the Bluetooth device. In one example, the Bluetooth serializer/deserializer 104 can determine whether a TXWOMA coexistence message 906 (shown in FIG. 9) was received at the Bluetooth device 102. In another embodiment, the Bluetooth serializer/deserializer 104 can receive a message and can provide the received message to the Bluetooth processing unit 830 (or to the link controller 106). The Bluetooth processing unit 830 (or the link controller 106) can analyze the received message and can determine whether the received message is a TXWOMA coexistence message 906. The Bluetooth processing unit 830 (or the link controller 106) can read a header of the received message (e.g., the message tag 402 of the coexistence message 450A of FIG. 4B) to determine whether the TXWOMA coexistence message 906 was received at the Bluetooth device 102. The TXWOMA coexistence message can indicate that the collocated WLAN device 120 transmitted a WLAN packet without having control of the communication medium. The TXWOMA coexistence message 906 can also indicate that the received Bluetooth packet (received at block 1104) may be corrupted. In one implementation, on determining that the TXWOMA coexistence message 906 was received at the Bluetooth device 102, the Bluetooth processing unit 830 can decode the TXWOMA coexistence message as described with reference to FIG. 6. The Bluetooth processing unit 830 can determine how to operate in response to the TXWOMA coexistence message 906. The Bluetooth processing unit 830 can read a message tag (e.g., the message tag 402 of FIG. 4B) of the TXWOMA coexistence message 906 and can access a set of instructions (e.g., one or more descriptors described in FIGS. 7A and 7B) that indicate how the TXWOMA coexistence message should be consumed. For example, based on the descriptors referenced by the message tag of the TXWOMA coexistence message 906, the Bluetooth processing unit 830 may determine that a retransmission request should be transmitted to the transmitting Bluetooth device 840. As another example, based on the descriptors referenced by the message tag of the TXWOMA coexistence message 906, the Bluetooth processing unit 830 may determine that the TXWOMA coexistence message should be ignored if the received Bluetooth packet passes CRC error detection operations. If it is determined that the coexistence message indicating transmission without medium access was received at the Bluetooth device 102, the flow continues at block 1108. Otherwise, the flow continues at block 1110.

At block 1108, a negative acknowledgement (NACK) packet requesting retransmission of the Bluetooth packet is transmitted. For example, the Bluetooth processing unit 830 of the Bluetooth device 102 transmits a NACK packet to the Bluetooth device 840 of FIG. 8 requesting retransmission of the Bluetooth packet. In one embodiment, on receiving the TXWOMA coexistence message 906, the Bluetooth serializer/deserializer 104 can determine whether or not to discard the received Bluetooth packet. For example, the Bluetooth serializer/deserializer 104 can cause the received Bluetooth packet to be discarded on determining that the Bluetooth packet was received as the WLAN device transmitted the WLAN packet. In another embodiment, the Bluetooth processing unit 830 (and/or the link controller 106) can determine whether or not to discard the received Bluetooth packet. In some implementations, the Bluetooth processing unit 830 (or the link controller 106) can perform CRC error detection operations on the received Bluetooth packet and can determine whether to discard the received Bluetooth packet based on results of the CRC error detection operations. It is noted, however, that in some implementations, the Bluetooth processing unit 830 may not transmit the NACK packet to request retransmission of the received Bluetooth packet. The transmitting Bluetooth device 840 may automatically retransmit the Bluetooth packet if the transmitting Bluetooth device 840 does not receive a response to the Bluetooth packet within a predefined time interval. From block 1108, the flow ends.

At block 1110, an acknowledgement indicating proper reception of the Bluetooth packet is transmitted. For example, the Bluetooth processing unit 830 transmits an ACK packet indicating proper reception of the Bluetooth packet. The flow 1100 moves from block 1106 to block 1110 if it is determined that the TXWOMA coexistence message was not received. It is noted that although not depicted in FIG. 11, if the TXWOMA coexistence message is not received, the Bluetooth processing unit 830 can analyze the received Bluetooth packet to detect errors in the received Bluetooth packet. For example, the Bluetooth processing unit 830 can perform operations for CRC error detection to determine whether the Bluetooth packet was incorrectly received. If it is determined that the received Bluetooth packet was correctly received, the Bluetooth processing unit 830 can transmit the ACK packet to the transmitting Bluetooth device 840. Otherwise, the Bluetooth processing unit 830 can transmit a NACK packet to the transmitting Bluetooth device 840. From block 1110, the flow ends.

It is noted that although not depicted in FIG. 11, in some implementations, the WLAN device 120 may have control of the communication medium and the WLAN device 120 may receive the TXWOMA coexistence message from the Bluetooth device 102. The WLAN device 120 can process the TXWOMA coexistence message as described above with reference to FIG. 11 to determine whether to request retransmission of a received WLAN packet. In one implementation, the WLAN serializer/deserializer 104 can receive the TXWOMA coexistence message, process the TXWOMA coexistence message, and determine whether to request retransmission of the received WLAN packet. In another implementation, the WLAN serializer/deserializer 104 can receive the TXWOMA coexistence message and provide the TXWOMA coexistence message to the WLAN processing unit 832 (or the MAC unit 124). The WLAN processing unit 832 (or the MAC unit 124), in turn, can analyze the TXWOMA coexistence message and determine whether to request retransmission of the received WLAN packet. In one example, the WLAN processing unit 832 (or the MAC unit 124) may execute error detection operations on the received WLAN packet and may request retransmission only if the received WLAN packet is found to have errors. In another example, the WLAN processing unit 832 (or the MAC unit 124) may request retransmission of the received WLAN packet irrespective of the results of executing error detection operations on the received WLAN packet. The WLAN processing unit 832 (or the MAC unit 124) may transmit a NACK packet to request retransmission of the received WLAN packet, or may not transmit any packet causing the transmitting WLAN device to automatically retransmit the WLAN packet after a predefined time interval.

It should be understood that the depicted diagrams (FIGS. 8 through 11) are examples meant to aid in understanding embodiments and should not be used to limit embodiments or limit scope of the claims. Embodiments may perform additional operations, fewer operations, operations in a different order, operations in parallel, and some operations differently. For instance, although FIGS. 8-11 depict the TXWOMA coexistence messages being exchanged between two collocated devices (i.e., the Bluetooth device 102 and the WLAN device 120), embodiments described herein are not limited to two collocated wireless network devices. Operations described with reference to FIGS. 8-11 can be implemented for any suitable number of collocated wireless network devices. For example, a WLAN device, a Bluetooth device, and a WiMAX device may be collocated on a common host device. The Bluetooth device may transmit a TXWOMA coexistence message to indicate transmission without medium access. The WLAN device and the WiMAX device can receive the TXWOMA coexistence message and can request (if necessary) retransmission of their respective received packets.

Moreover, although FIG. 8 depicts the Bluetooth device 102 discarding the received Bluetooth packet on receiving the TXWOMA coexistence message, embodiments are not so limited. In some implementations, on receiving the TXWOMA coexistence message, the Bluetooth device 102 (e.g., the Bluetooth processing unit 830 and/or the link controller 106) can perform further analysis to determine whether or not to discard the received Bluetooth packet. For example, the Bluetooth device 102 may rely on error detection mechanisms implemented by the Bluetooth device (e.g., a CRC error detection mechanism, other upper protocol error detection mechanisms) to determine whether the received Bluetooth packet is corrupted and to request retransmission (if required). For example, based on knowledge of a desired throughput, the Bluetooth device 102 may choose to ignore the TXWOMA message, perform a CRC analysis of the received Bluetooth packet, and provide the received Bluetooth packet to upper protocol layers if the received Bluetooth packet passes the CRC analysis. The Bluetooth device 102 may rely on the upper protocol layers to further analyze the received Bluetooth packet, determine whether the received Bluetooth packet is corrupted (and the CRC analysis is incorrect), and accordingly request retransmission of the received Bluetooth packet. Alternately, as described above, on receiving the TXWOMA coexistence message, the Bluetooth device 102 might discard the received Bluetooth packet and request retransmission of the received Bluetooth packet at the PHY layer without providing the received Bluetooth packet to the upper layer protocols or relying on the CRC analysis. In one implementation, the Bluetooth device 102 may determine how to operate in response to receiving the TXWOMA coexistence message based on the robustness of a data transfer protocol implemented for receiving the Bluetooth packet. For example, data packets exchanged using a Bluetooth OBEX protocol are protected only by a 16-bit CRC. In this case, on receiving the TXWOMA coexistence message, the Bluetooth device 102 may choose to not rely on the 16-bit CRC error detection mechanism and may request retransmission of the received Bluetooth packet irrespective of the results of executing CRC error detection operations on the received Bluetooth packet. As another example, a Bluetooth file transfer protocol (FTP) is a more robust data transfer protocol and data packets exchanged using FTP are protected by multiple error detection mechanisms. In this case, on receiving the TXWOMA coexistence message, the Bluetooth device 102 may choose to rely on the multiple error detection mechanisms and may request retransmission of the received Bluetooth packet only if the received Bluetooth packet is deemed to be corrupted.

It is also noted that in some implementations, a coexistence unit separate from the Bluetooth device 102 and the WLAN device 120 may be implemented (e.g., on a host computer system) to schedule communications of the Bluetooth device 102 and the WLAN device 120 and to grant control of the communication medium to either the Bluetooth device 102 or the WLAN device 120. On transmitting the WLAN packet without control of the communication medium, the WLAN serializer 122A can notify the coexistence unit of the unscheduled WLAN packet transmission. Accordingly, the coexistence unit can transmit the TXWOMA coexistence message to the Bluetooth deserializer 104B.

Although FIGS. 8-11 depicts the TXWOMA coexistence message being transmitted to a collocated Bluetooth device 102 in response to the WLAN device 120 transmitting an ACK packet, embodiments are not so limited. The WLAN device 120 may transmit any suitable packet without having control of the communication medium and may transmit the TXWOMA coexistence message in response to such an unscheduled packet transmission. For example, the WLAN device 120 might request packet retransmission when the WLAN device 120 does not have control of the communication medium. Likewise, the Bluetooth device 102 might transmit an ACK packet or a NACK packet when the Bluetooth device 102 does not have control of the communication medium. As another example, the Bluetooth device 102 might transmit a SCO packet at a predefined periodic interval even when the Bluetooth device 102 does not have control of the communication medium.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 12:
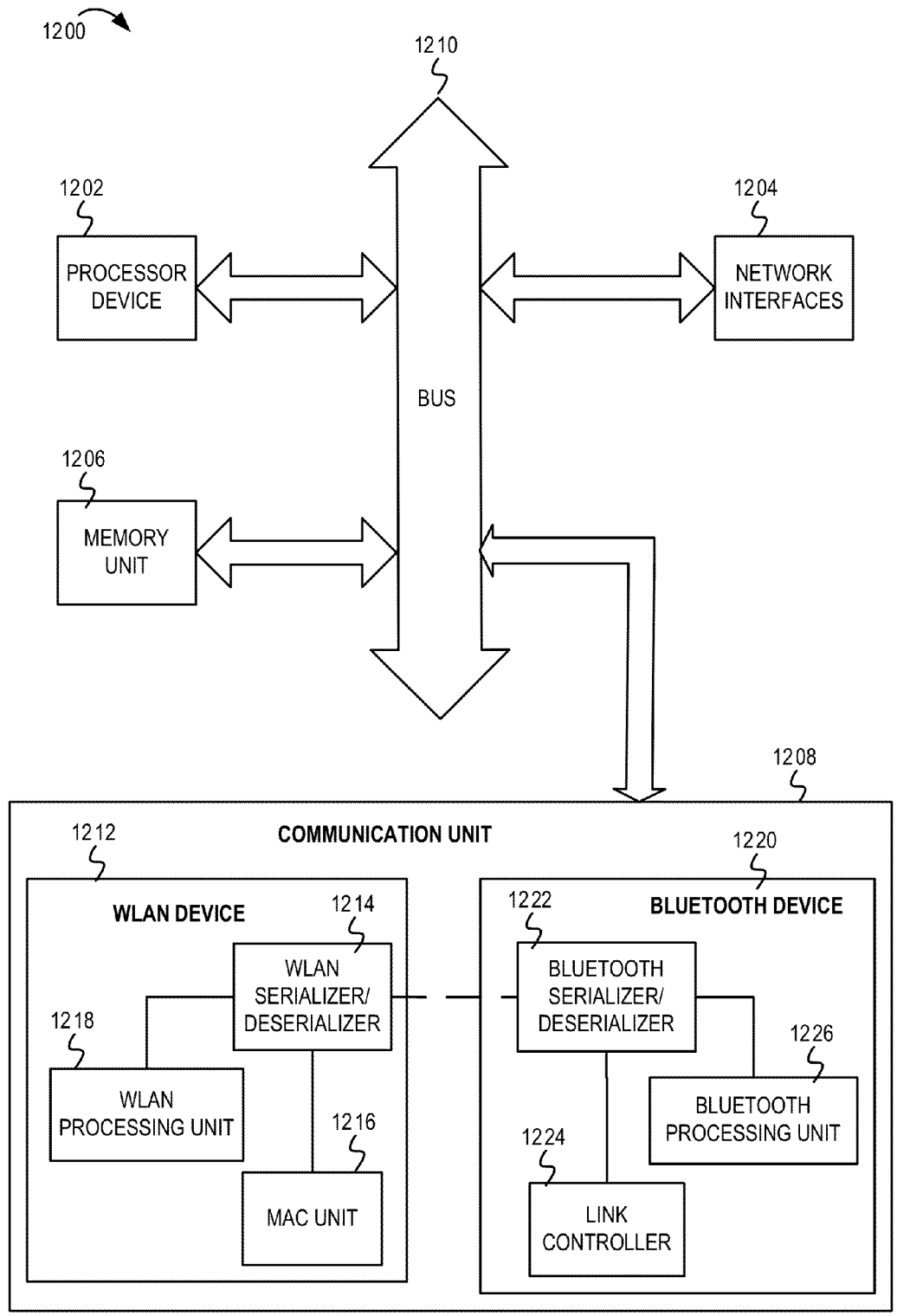
FIG. 12 is a block diagram of one embodiment of a computer system including a mechanism for detecting interference in co-located wireless network devices.

FIG. 12 is a block diagram of one embodiment of a computer system 1200 including a mechanism for detecting interference in co-located wireless network devices. In some implementations, the computer system 1200 may be one of a personal computer (PC), a laptop, a netbook, a mobile phone, a personal digital assistant (PDA), or other electronic systems comprising a collocated Bluetooth device and a WLAN device. The computer system 1200 includes a processor unit 1202 (possibly including multiple processors, multiple cores, multiple nodes, and/or implementing multi-threading, etc.). The computer system 1200 includes a memory unit 1206. The memory unit 1206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 1200 also includes a bus 1210 (e.g., PCI, ISA, PCI-Express, HyperTransport®, InfiniBand®, NuBus, AHB, AXI, etc.), and network interfaces 1204 that include at least one wireless network interface (e.g., a WLAN interface, a Bluetooth® interface, a WiMAX interface, a ZigBee® interface, a Wireless USB interface, etc.).

The computer system 1200 also includes a communication unit 1208. The communication unit 1208 comprises a Bluetooth device 1220 coupled with a WLAN device 1212 via a message based coexistence interface (MCI). The WLAN device 1212 comprises a WLAN serializer/deserializer 1214, a MAC unit 1216, and a WLAN processing unit 1218. The WLAN serializer/deserializer 1214 is coupled to the MAC unit 1216 and to the WLAN processing unit 1218. The Bluetooth device 1220 comprises a Bluetooth serializer/deserializer 1222, a link controller 1224, and a Bluetooth processing unit 1226. The Bluetooth serializer/deserializer 1222 is coupled to the link controller 1224 and to the Bluetooth processing unit 1226. The WLAN device 1212 may transmit a TXWOMA coexistence message to the collocated Bluetooth device 1220 via the MCI if the WLAN device 1212 transmits a WLAN packet without having control of a communication medium, as described with reference to FIGS. 8-11. The Bluetooth device 1220 can discard a received Bluetooth packet and can request retransmission of the Bluetooth packet, in response to receiving the TXWOMA coexistence message as described with reference to FIGS. 8-11. Likewise, the Bluetooth device 1220 may also transmit a TXWOMA coexistence message to the WLAN device 1212 via the MCI if the Bluetooth device 1220 transmits a Bluetooth packet without having control of the communication medium.

While the embodiments are described with reference to various implementations and exploitations, it will be understood that these embodiments are illustrative and that the scope of the inventive subject matter is not limited to them. In general, techniques for detecting interference between co-located network devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
determining, at a first wireless network device of a communication system comprising the first wireless network device and a second wireless network device, that the first wireless network device has control of a communication medium associated with the communication system;
receiving, at the first wireless network device, a coexistence message from the second wireless network device that indicates that the second wireless network device transmitted a packet while the first wireless network device has control of the communication medium;
determining that a packet, received at the first wireless network device while the first wireless network device has control of the communication medium, should be discarded based, at least in part, on said receiving the coexistence message that indicates that the second wireless network device transmitted the packet while the first wireless network device has control of the communication medium; and
requesting retransmission of the packet received at the first wireless network device.

2. The method of claim 1, wherein said determining that the first wireless network device has control of the communication medium associated with the communication system further comprises:
exchanging, with the second wireless network device, scheduling-based coexistence messages to determine control of the communication medium.

3. The method of claim 1, wherein said receiving the coexistence message from the second wireless network device that indicates that the second wireless network device transmitted a packet while the first wireless network device has control of the communication medium further comprises:
receiving the coexistence message via a message based coexistence interface (MCI) between the first wireless network device and the second wireless network device.

4. The method of claim 1, wherein said requesting retransmission of the packet received at the first wireless network device further comprises discarding the packet received at the first wireless network device.

5. The method of claim 1, further comprising:
transmitting, from the first wireless network device, a transmit packet to a third wireless network device of a second communication system;
determining that the first wireless network device does not have control of the communication medium and that the second wireless network device has control of the communication medium; and
transmitting, to the second wireless network device, a coexistence message indicating that the first wireless network device transmitted the transmit packet without control of the communication medium.

6. The method of claim 1, further comprising:
receiving, at the first wireless network device, a second packet from a third wireless network device of a second communication system;
determining that a second coexistence message that indicates that the second wireless network device transmitted a packet while the first wireless network device has control of the communication medium was not received at the first wireless network device from the second wireless network device;
determining whether the second packet was properly received at the first wireless network device;
transmitting an acknowledgement packet to the third wireless network device in response to determining that the second packet was properly received at the first wireless network device; and
requesting retransmission of the second packet in response to determining that the second packet was incorrectly received at the first wireless network device.

7. The method of claim 1, wherein the first wireless network device is a Bluetooth device and the second wireless network device is a wireless local area network (WLAN) device.

8. The method of claim 1, wherein the first wireless network device is a WLAN device and the second wireless network device is a Bluetooth device.

9. The method of claim 1, wherein the first wireless network device and the second wireless network device are collocated within a common integrated circuit or within a common circuit board of the communication system.

10. The method of claim 1, wherein said determining that the packet, received at the first wireless network device while the first wireless network device has control of the communication medium, should be discarded further comprises:
reading a message tag in a header of the coexistence message, wherein the message tag identifies content of the coexistence message;
determining, based on the message tag, that the coexistence message received at the first wireless network device indicates that the second wireless network device transmitted a packet without control of the communication medium; and
identifying one or more instructions that indicate subsequent processing operations of the first wireless network device in response to said determining that the coexistence message received at the first wireless network device indicates that the second wireless network device transmitted a packet without control of the communication medium.

11. The method of claim 10, further comprising processing the coexistence message in accordance with the one or more instructions, wherein said processing the coexistence message in accordance with the one or more instructions comprises one of:
transmitting, from the first wireless network device, a retransmission request message for said requesting retransmission of the packet received at the first wireless network device, or
preventing transmission of the retransmission request message for a predefined acknowledgment time interval to cause the packet received at the first wireless network device to be automatically retransmitted after the predefined acknowledgment time interval expires.

12. A communication system comprising:
a first wireless network device operable to:
transmit a coexistence message to a second wireless network device of the communication system indicating that the first wireless network device transmitted a packet without control of the communication medium; and the second wireless network device collocated with the first wireless network device in the communication system, the second wireless network device operable to:
  receive a packet from a third wireless network device of a second communication system when the second wireless network device has control of the communication medium;
  receive, from the first wireless network device, the coexistence message indicating that the first wireless network device transmitted a packet without control of the communication medium;
  determine that the packet received at the second wireless network device should be discarded based on the second wireless network device receiving the coexistence message indicating that the first wireless network device transmitted a packet without control of the communication medium; and
  request retransmission of the packet received at the second wireless network device.

13. The communication system of claim 12, wherein the first wireless network device operable to transmit the coexistence message to the second wireless network device further comprises the first wireless network device operable to:
  in response to receiving a packet from a fourth wireless network device of a third communication system, transmit an acknowledgement packet to the fourth wireless network device without control of the communication medium; and
  in response to the first wireless network device transmitting the acknowledgement packet, transmit the coexistence message to the second wireless network device indicating that the first wireless network device transmitted a packet without control of the communication medium.

14. The communication system of claim 12, wherein the first wireless network device operable to transmit the coexistence message to the second wireless network device further comprises the first wireless network device operable to:
  determine content of the coexistence message; and
  encapsulate the content of the coexistence message in a header to generate the coexistence message.

15. The communication system of claim 14, wherein the first wireless network device operable to transmit the coexistence message to the second wireless network device is in response to one of:
  the first wireless network device receiving a trigger for creating the coexistence message from a processing unit of the first wireless network device indicating at least one memory location from where the content of the coexistence message should be retrieved, wherein the trigger is a hardware trigger or a software trigger, or
  the first wireless network device receiving content of the coexistence message from a hardware component of the first wireless network device.

16. The communication system of claim 12, wherein the first wireless network device is further operable to exchange scheduling-based coexistence messages with the second wireless network device to determine that the second wireless network device has control of the communication medium associated with the communication system.

17. The communication system of claim 12, wherein the second wireless network device operable to receive the coexistence message further comprises the second wireless network device operable to:
  receive the coexistence message via a message based coexistence interface (MCI) between the first wireless network device and the second wireless network device.

18. The communication system of claim 12, wherein the second wireless network device operable to determine that the packet received at the second wireless network device should be discarded further comprises the second wireless network device operable to:
  read a message tag in a header of the coexistence message, wherein the message tag identifies content of the coexistence message;
  determine, based on the message tag, that the coexistence message received at the second wireless network device indicates that the first wireless network device transmitted a packet without control of the communication medium; and
  identify one or more instructions that indicate subsequent processing operations of the second wireless network device in response to the second wireless network device determining that the coexistence message received at the second wireless network device indicates that the first wireless network device transmitted a packet without control of the communication medium.

19. The communication system of claim 12, wherein the first wireless network device and the second wireless network device are collocated within a common integrated circuit or within a common circuit board of the communication system.

20. An integrated circuit of a communication system, the integrated circuit comprising:
  a first wireless network device operable to:
    transmit, via a message based coexistence interface between the first wireless network device and a second wireless network device of the integrated circuit, a coexistence message to the second wireless network device indicating that the first wireless network device transmitted a packet without control of a communication medium associated with the communication system; and
  the second wireless network device collocated with the first wireless network device on the integrated circuit, the second wireless network device operable to:
    receive a packet from a third wireless network device of a second communication system when the second wireless network device has control of the communication medium;
    receive, via the message based coexistence interface from the first wireless network device, the coexistence message indicating that the first wireless network device transmitted a packet without control of the communication medium;
    determine that packet received at the second wireless network device should be discarded based on the second wireless network device receiving the coexistence message indicating that the first wireless network device transmitted a packet without control of the communication medium; and
    request retransmission of the packet received at the second wireless network device.

21. The integrated circuit of claim 20, wherein the first wireless network device operable to transmit the coexistence message to the second wireless network device further comprises the first wireless network device operable to:
  in response to receiving a packet from a fourth wireless network device of a third communication system, transmit an acknowledgement packet to the fourth wireless network device without control of the communication medium; and
  in response to the first wireless network device transmitting the acknowledgement packet, transmit the coexistence message to the second wireless network device indicating that the first wireless network device transmitted a packet without control of the communication medium.

* * * * *